(12) United States Patent
Mizushima et al.

(10) Patent No.: US 7,350,023 B2
(45) Date of Patent: Mar. 25, 2008

(54) MEMORY CARD

(75) Inventors: Nagamasa Mizushima, Kawasaki (JP);
Takashi Tsunehiro, Kawasaki (JP);
Motoyasu Tsunoda, Kawasaki (JP);
Toshio Tanaka, Kawasaki (JP);
Kunihiro Katayama, Kawasaki (JP);
Koichi Kimura, Kawasaki (JP);
Tomihisa Hatano, Kawasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/636,629

(22) Filed: Dec. 11, 2006

(65) Prior Publication Data

US 2007/0088906 A1    Apr. 19, 2007

Related U.S. Application Data

(63) Continuation of application No. 10/476,223, filed on May 12, 2004, now Pat. No. 7,185,145.

(51) Int. Cl.
*G06F 12/00* (2006.01)

(52) U.S. Cl. ...................... 711/115; 713/200

(58) Field of Classification Search ............... 711/115
See application file for complete search history.

(56) References Cited

U.S. PATENT DOCUMENTS

| | | | |
|---|---|---|---|
| 4,985,921 A | 1/1991 | Schwartz | |
| 5,375,222 A | 12/1994 | Robinson et al. | |
| 5,798,507 A | 8/1998 | Kawagishi et al. | |
| 5,812,762 A * | 9/1998 | Kim | 726/20 |
| 5,875,480 A | 2/1999 | Le Roux et al. | |
| 6,003,100 A | 12/1999 | Lee | |
| 6,079,019 A | 6/2000 | Fukuzumi | |
| 6,161,163 A * | 12/2000 | Komatsu et al. | 711/103 |
| 6,182,205 B1 | 1/2001 | LeRoux et al. | |
| 6,418,501 B1 | 7/2002 | Gama et al. | |
| 6,434,648 B1 | 8/2002 | Assour et al. | |
| 6,606,707 B1 | 8/2003 | Hirota et al. | |
| 7,011,247 B2 * | 3/2006 | Drabczuk et al. | 235/451 |
| 2001/0021976 A1 | 9/2001 | Shibuya et al. | |

FOREIGN PATENT DOCUMENTS

| | | |
|---|---|---|
| EP | 0449255 | 10/2002 |
| JP | 5-314013 | 11/1993 |
| JP | 8-55200 | 2/1996 |

OTHER PUBLICATIONS

EPO Search Report dated Dec. 3, 2004.

* cited by examiner

*Primary Examiner*—Donald Sparks
*Assistant Examiner*—Hashem Farrokh
(74) *Attorney, Agent, or Firm*—Antonelli, Terry, Stout & Kraus, LLP.

(57) ABSTRACT

A memory device is provided which is connected to operate with power and clocks supplied from a host apparatus. The memory device includes external terminals, a flash memory chip to store data, an IC chip to process data; and a controller chip connected with the external terminals, the flash memory chip and the IC chip, wherein, the flash memory chip, the IC chip and the controller chip are discrete chips. The controller chip writes data inputted from the host apparatus into the flash memory chip or the IC chip and transfers data read from the flash memory chip or the IC chip to the host apparatus, based upon commands from the host apparatus.

32 Claims, 27 Drawing Sheets

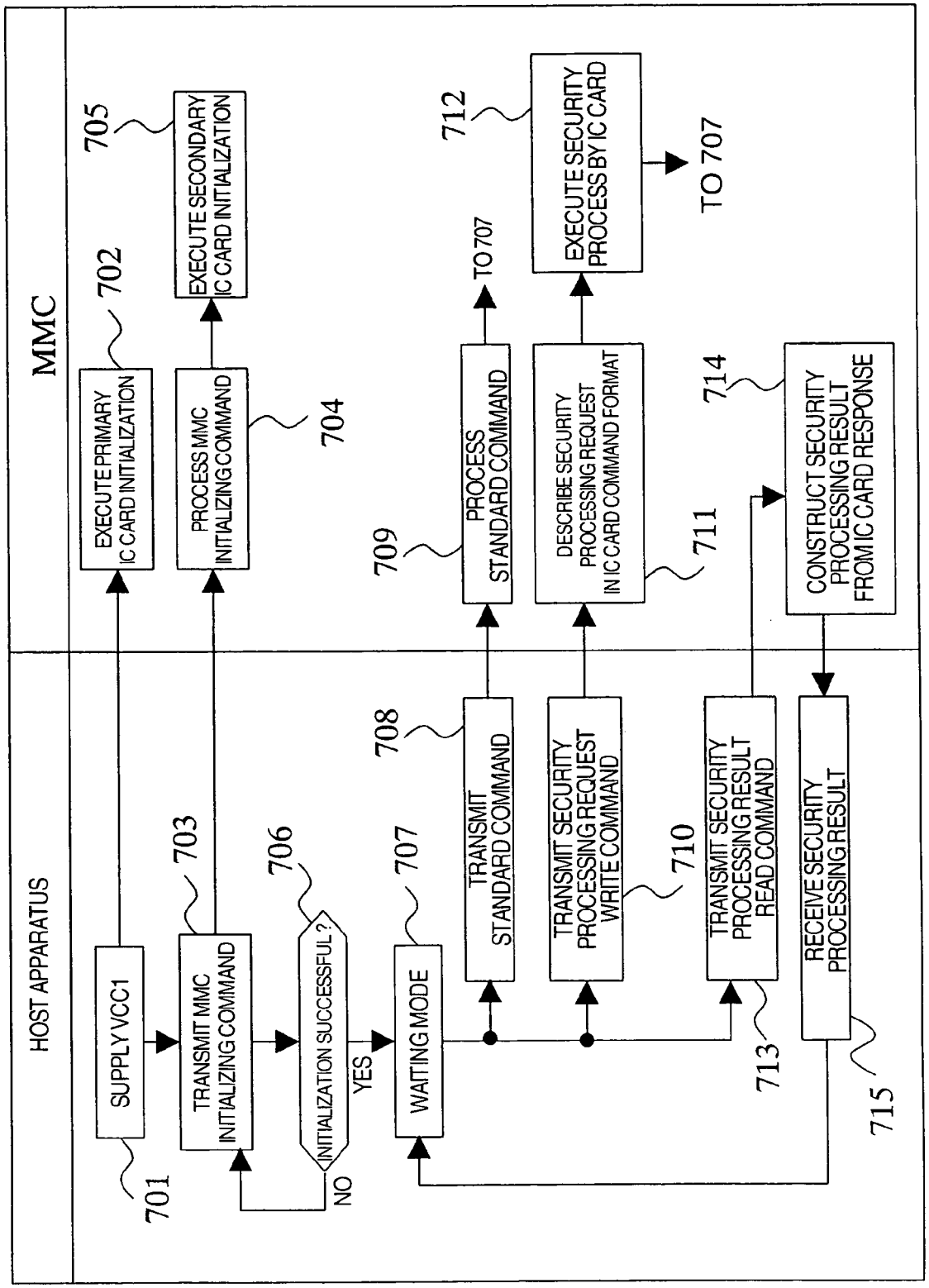

FIG.8

| IC CARD CONTROL PARAMETERS | | PROCESSES FOR IC CARD |
|---|---|---|
| A=0 | | UPON POWER-ON OF MMC, DO NOTHING |
| A=1 | | UPON POWER-ON OF MMC, RESET |
| A=2 | | UPON POWER-ON OF MMC, RESET AND MAKE ENVIRONMENT SETTING |
| A=3 | | UPON POWER-ON OF MMC, RESET, MAKE ENVIRONMENT SETTING, AND INACTIVATE |
| B=0 | | UPON INITIALIZATION OF MMC, DO NOTHING |
| B=1 | C=1 | UPON INITIALIZATION OF MMC, RESET |
| | C=2 | UPON INITIALIZATION OF MMC, RESET AND MAKE ENVIRONMENT SETTING |
| | C=3 | UPON INITIALIZATION OF MMC, RESET, MAKE ENVIRONMENT SETTING, AND INACTIVATE |
| B=2 | C=2 | UPON INITIALIZATION OF MMC, MAKE ENVIRONMENT SETTING |
| | C=3 | UPON INITIALIZATION OF MMC, MAKE ENVIRONMENT SETTING AND INACTIVATE |
| B=3 | | UPON INITIALIZATION OF MMC, IF IT IS IN ACTIVE STATE, INACTIVATE |
| D=0 | | AFTER SECURITY PROCESS, NOT INACTIVATE |
| D=1 | | AFTER SECURITY PROCESS, INACTIVATE |

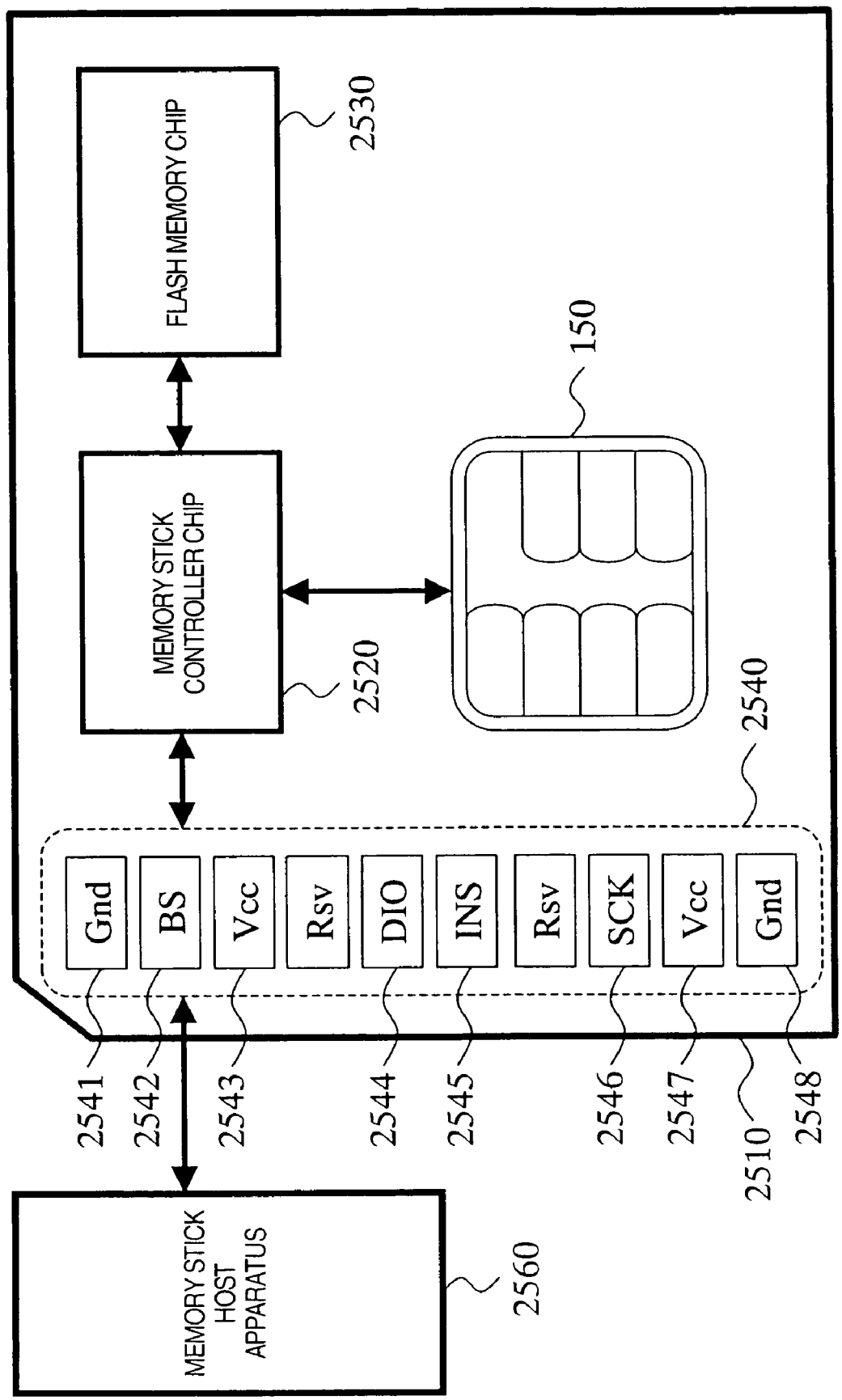

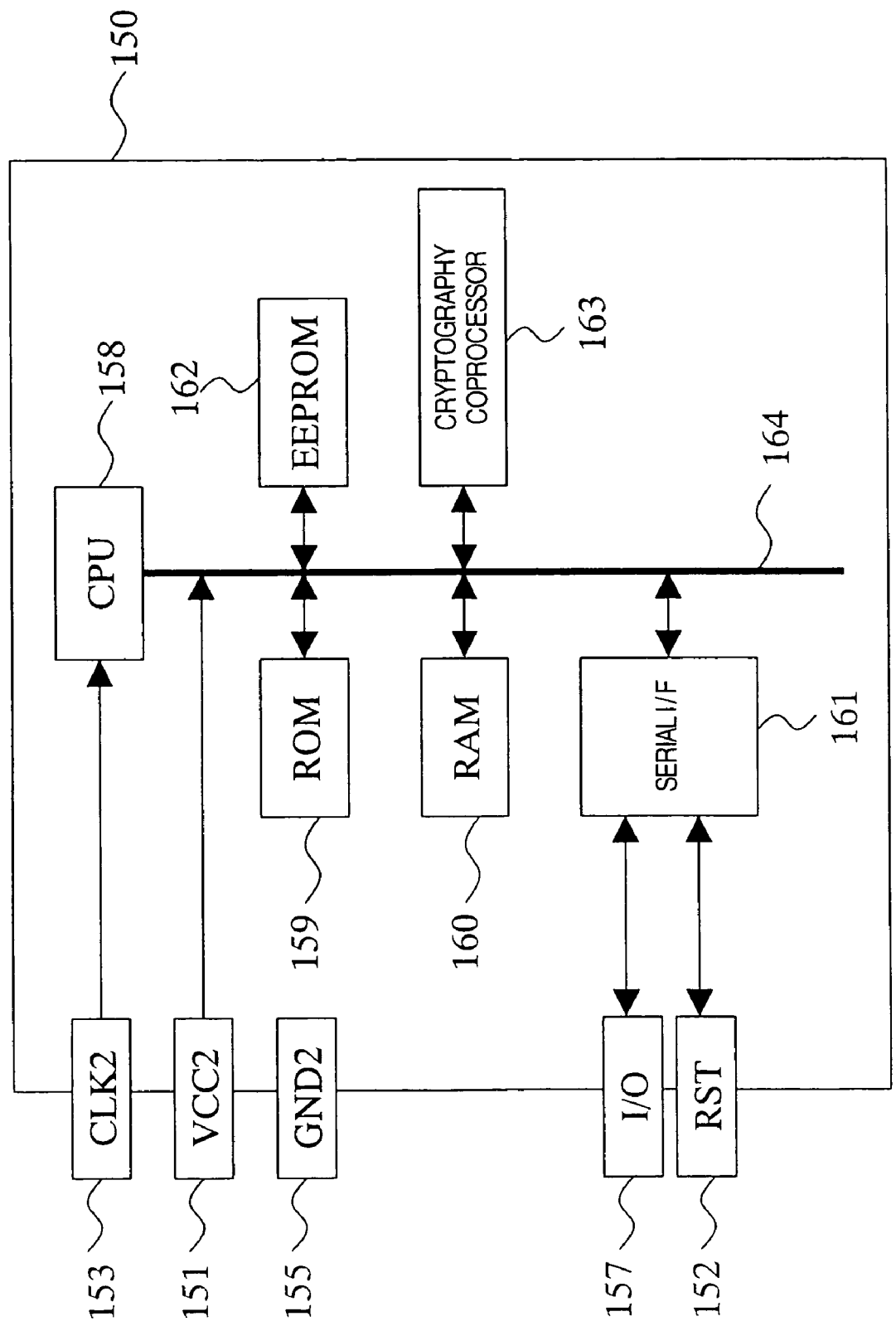

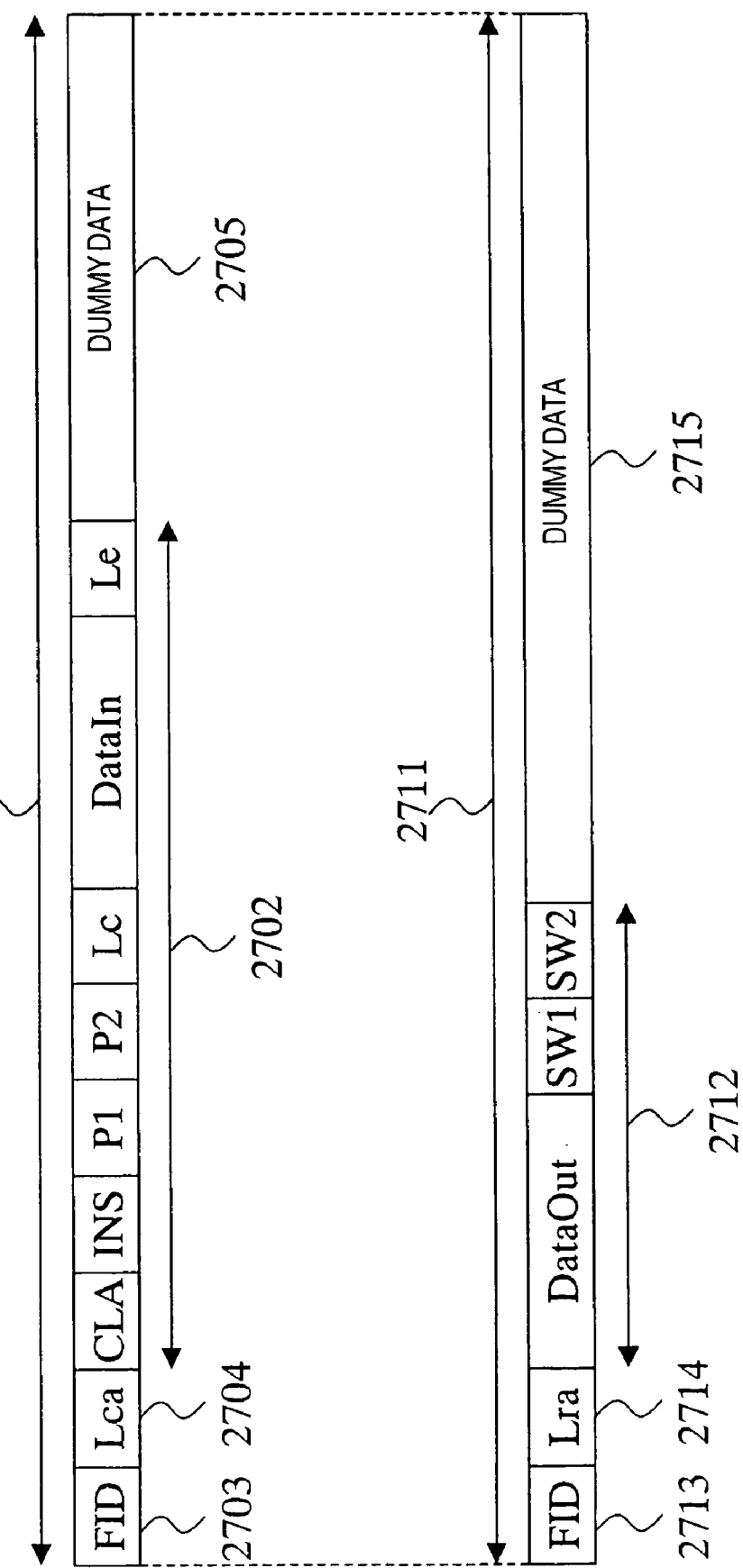

MEMORY CARD

CROSS REFERENCE TO RELATED APPLICATION

This is a continuation of U.S. application Ser. No. 10/476,223, filed May 12, 2004 now U.S. Pat. No. 7,185,145. This application relates to and claims priority from Japanese Patent Application No. 2001-167617, filed on Jun. 4, 2001. The entirety of the contents and subject matter of all of the above is incorporated herein by reference.

TECHNICAL FIELD

The invention relates to a storage apparatus having a security function, a host apparatus in which the storage apparatus can be inserted, and the host apparatus in which the storage apparatus has been inserted and, more particularly, to a memory card having an electrically erasable non-volatile memory (for example, flash memory), a host apparatus in which the memory card can be inserted, and the host apparatus in which the memory card has been inserted.

BACKGROUND ART

An IC card is constructed by embedding an IC (Integrated Circuit) chip into a plastic card substrate and has external terminals of the IC chip on its surface. As external terminals of the IC chip, there are a power terminal, a clock terminal, a data input/output terminal, and the like. A connecting apparatus directly supplies a power source and drive clocks from the external terminals to the IC chip, so that the IC chip operates. The IC card exchanges information with the connecting apparatus such as a terminal or the like by transmitting and receiving an electric signal to/from the connecting apparatus via the external terminals. As a result of the information exchange, the IC card transmits a calculation result and stored information or changes the stored information. The IC card can have a function for executing a security process such as protection of secret data, personal identification, or the like on the basis of those operation specifications. The IC card is used as a user device for personal identification in a system of credit settlement, banking, or the like which needs security of secret information.

The IC card which is used in the security system needs to be designed so that when an arithmetic operation is executed by using the secret information, the secret information or information by which the secret information can be presumed is not leaked to the outside. That is, it is necessary that the IC card has tamper-resistance. As an attacking method for analyzing the secret information which must not be leaked to the outside, a timing analysis, an electric power difference analysis, a failure use analysis, or the like is known.

The timing analysis is an attacking method whereby when a cryptographic processing time differs depending on contents of the secret information, the time difference is statistically analyzed and the secret information is presumed. There is a case where when a cryptographic algorithm is implemented, optimization such that unnecessary processes are skipped or a branching process is executed in dependence on the contents of the secret information is applied for the purpose of shortening the processing time or reducing a program size. If such optimization is applied, the cryptographic processing time differs depending on the contents of the secret information. Therefore, there is a possibility that the contents of the secret information can be presumed by checking the processing time.

The electric power difference analysis is an attacking method whereby electric power which is supplied from the power terminal of the IC card is measured during execution of a cryptographic process and a difference in electric power consumption is analyzed from the measured power, thereby presuming the secret information.

The failure use analysis is an attacking method using a calculation error of the IC card. A transient failure is caused or a limited trouble in a range where it does not affect other functions is given to the IC card, thereby making the IC card execute an abnormal process which the attacker desires. If an error is caused on purpose by applying a high voltage to the IC card or momentarily fluctuating a clock frequency or a drive voltage, there is a possibility that the secret information is obtained from a wrong calculation result which is thus obtained and a correct calculation result.

The IC card must have countermeasure means against those attacking methods in practical use.

DISCLOSURE OF INVENTION

It is the first object of the invention to provide a storage apparatus in which security is improved.

The second object of the invention is to provide a storage apparatus in which manufacturing is simplified.

To accomplish the first object, the invention comprises: a memory in which data can be stored; a processing apparatus which can store the data and execute a security process of the data; and a controller for controlling the memory and the processing apparatus on the basis of a command from an external host apparatus.

To accomplish the first object, the invention comprises: a flash memory chip; a controller; an external terminal; and an IC chip, wherein a ground terminal of the IC chip is connected to the external terminal and a power input terminal, a reset input terminal, a clock input terminal, and a data input/output terminal of the IC chip are connected to the controller.

To accomplish the second object, the invention comprises: a flash memory chip in which data can be stored; a controller for controlling read/write of the data from/to the flash memory chip; and an IC chip, wherein after the IC chip is previously authenticated by the authentication facilities, it is installed.

Other objects, features, and advantages of the invention will be apparent from the following description of the embodiments of the invention in conjunction with accompanying drawings.

BRIEF DESCRIPTION OF DRAWINGS

FIG. 7 is a flowchart showing an access to the MMC by the host apparatus.

FIG. 8 is a table showing IC card control parameters and contents of processes to an IC card corresponding to the parameters.

FIG. 25 is a diagram simply showing an internal construction of a memory stick to which the invention is applied.

FIG. 26 is a diagram showing an internal construction of the IC card chip of the invention.

FIG. 27 is a diagram showing an example of a security processing request and each data format of a security processing result.

BEST MODE FOR CARRYING OUT THE INVENTION

An embodiment of the invention will be described hereinbelow.

Figure 22:
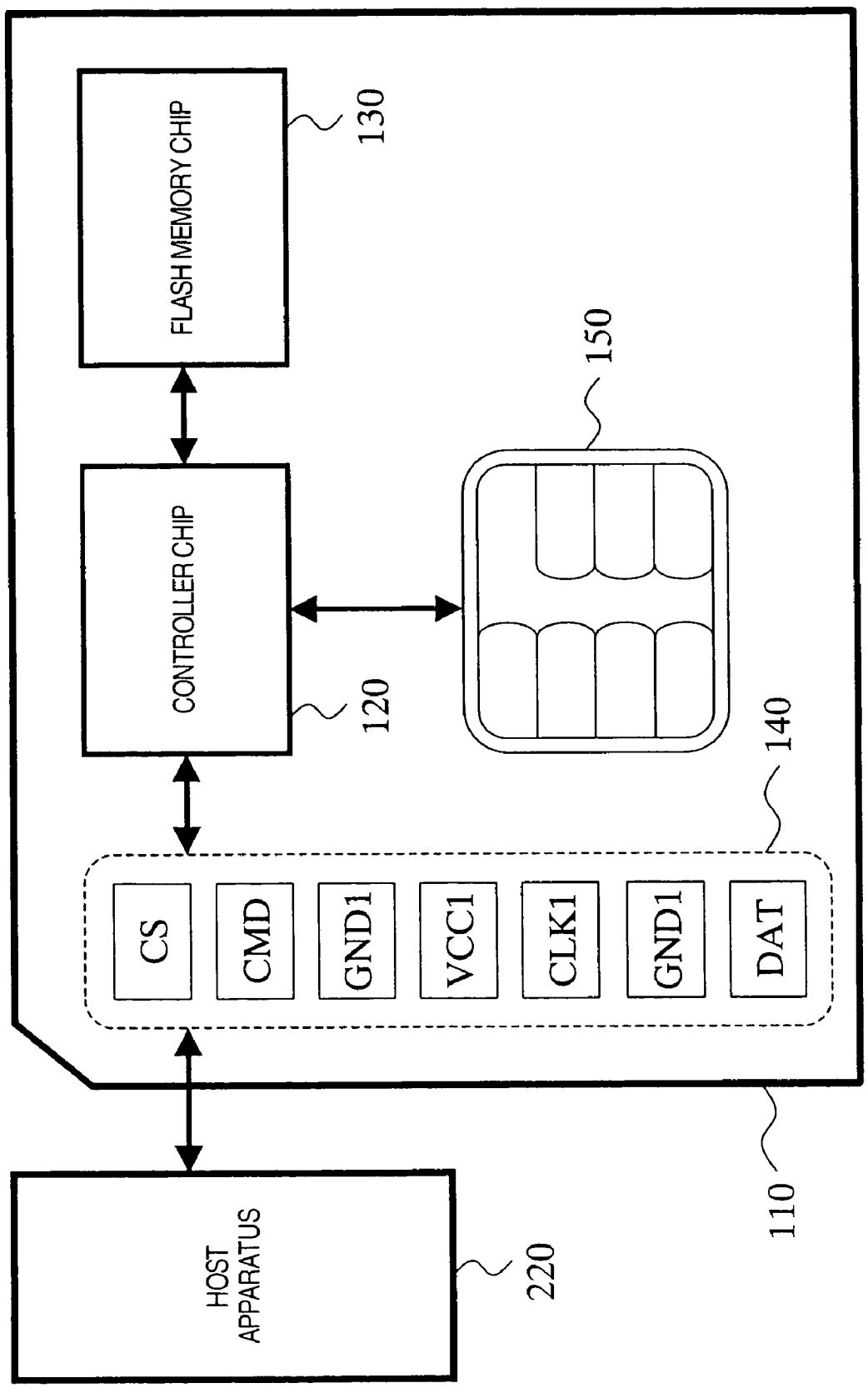
FIG. 22 is a diagram simply showing an internal construction of the MMC to which the invention is applied.

FIG. 22 simply shows an internal constructional diagram of a Multi Media Card (Multi Media Card is a registered trademark of Infineon Technologies AG; hereinafter, abbreviated to "MMC") to which the invention is applied. It is desirable that an MMC 110 complies with Multi Media Card specifications. The MMC 110 has a security processing function such that a host apparatus 220 connected to the outside issues a memory card command according to the Multi Media Card specifications, thereby executing a cryptographic arithmetic operation which is necessary for protection of secret data, personal identification, or the like. The host apparatus 220 corresponds to, for example, a cellular phone, a Personal Digital Assistant (PDA), a personal computer, a music player (and recorder), a camera, a video camera, an automatic teller machine, a kiosk terminal, a settlement terminal, or the like. The MMC 110 has an MMC external terminal 140, a controller chip 120, a flash memory chip 130, and an IC card chip 150. The flash memory chip 130 is a memory chip using a non-volatile semiconductor memory as a memory medium and can read and write data by a flash memory command. The MMC external terminal 140 is constructed by seven terminals and includes a power supply terminal, a clock input terminal, a command input/output terminal, a data input/output terminal, and a ground terminal in order to exchange information with the external host apparatus 220. The controller chip 120 is connected to other component elements (MMC external terminal 140, flash memory chip 130, and IC card chip 150) in the MMC 110 and is a microcomputer chip for controlling them. The IC card chip 150 is a microcomputer chip which is embedded into the plastic substrate of the IC card, and its external terminals, an electric signal protocol, and a command comply with the ISO/IEC 7816 standard. As external terminals of the IC card chip 150, there are a power supply terminal, a clock input terminal, a reset input terminal, an I/O input/output terminal, and a ground terminal. The controller chip 120 issues an IC card command to the IC card chip 150 from the external terminal of the IC card chip 150, thereby executing an arithmetic operation necessary for a security process requested from the external host apparatus 220.

FIG. 26 is a diagram showing an internal construction of the IC card chip of the invention. The IC card chip 150 comprises: a CPU (microcomputer) 158 for executing an arithmetic operating process; a ROM (Read Only Memory) 159, a RAM (Random Access Memory) 160, and an EEPROM (Electrically Erasable Programmable ROM) 162 for storing data (including a program); a cryptography coprocessor 163 for executing processes regarding encryption/decryption; and a serial interface 161 for transmitting and receiving data to/from the outside. Those component elements are connected by a bus 164. The IC card chip 150 itself can execute the security process by the cryptography coprocessor 163 in accordance with a command from the host apparatus 220. The CPU 158 can also execute the security process in accordance with a program (software) in place of the cryptography coprocessor 163 (hardware).

Although the flash memory chip 130 has a storage apparatus, no microcomputer exists there. The security process is executed, for example, when data is written into a storing area in the IC card chip 150 or when the data is read out from the storing area in the IC card chip 150. A memory capacity of the EEPROM of the IC card chip 150 is smaller than that of the flash memory chip 130. However, the memory capacity of the EEPROM of the IC card chip 150 can be equal to or larger than that of the flash memory chip 130.

As an IC card chip 150, a product which has been authenticated by the evaluation and authentication facilities of ISO/IEC 15408 as an international standard of the security evaluation reference is used. Generally, when an IC card having a function for executing the security process is used in an actual electronic fund transfer service or the like, the IC card needs to be evaluated and authenticated by the evaluation and authentication facilities of ISO/IEC 15408. In the case where the MMC 110 is realized by adding the function for executing the security process to the MMC and used in an actual electronic fund transfer service or the like, the MMC 110 also similarly needs to be evaluated and authenticated by the evaluation and authentication facilities of ISO/IEC 15408. According to the invention, the MMC 110 has therein the IC card chip 150 which has been authenticated by the evaluation and authentication facilities and has a structure for executing the security process by using the IC card chip 150, thereby obtaining the security processing function. Therefore, the MMC 110 can easily satisfy the security evaluation reference based on ISO/IEC 15408 and a developing period of time necessary for adding the security processing function to the MMC can be shortened.

It is preferable that the MMC 110 has an external interface according to the Multi Media Card specifications. The MMC 110 needs to receive a command for executing the security process in addition to a standard memory card command (command for accessing the flash memory chip 130) via one kind of external interface. The controller chip 120 has a function for selecting the chip to be accessed in accordance with whether the command received by the MMC 110 is the standard memory card command or the command for executing the security process and distributing command processes. According to the invention, if the standard memory card command is received, the flash memory chip 130 is selected, a flash memory command is issued thereto, and host data can be read/written. If the command for executing the security process is received, the IC card chip 150 is selected, an IC card command is issued thereto, and the security process can be executed.

As external terminals of the IC card chip 150, the power supply terminal, clock input terminal, reset input terminal, and I/O input/output terminal excluding the ground terminal are connected to the controller chip 120.

The controller chip 120 controls a power supply and a clock supply to the IC card chip 150 via the power supply terminal and the clock input terminal. According to the invention, when no security process is required from the host apparatus 220, the power supply and the clock supply to the IC card chip 150 can be stopped and electric power consumption of the MMC 110 can be saved.

To set the IC card chip 150 to which no power source is supplied into a state where it can receive the IC card command, first, it is necessary to start the power supply to the IC card chip 150 and execute a resetting process (including the start of the clock supply). For example, when the MMC 110 receives the command for executing the security process from the host apparatus 220, the controller chip 120 can start the power supply to the IC card chip 150 via the power supply terminal by using such receiving timing as a trigger, or it is also possible to construct in a manner such that even when the security process is not executed, the power supply to the IC card chip 150 is maintained and when the MMC 110 receives the command for executing the security process from the host apparatus 220, the controller chip 120 executes the resetting process of the IC card chip 150 is executed via the reset input terminal by using such receiving timing as a trigger. According to the invention, the controller chip 120 can stop the supply of both of the power source and the clock to the IC card chip 150 or only the clock supply until the command for executing the security process is received. Therefore, the electric power consumption of the MMC 110 can be saved. When the IC card chip 150 supports the operation of a sleep mode, the electric power consumption can be fairly reduced merely by stopping only the clock supply when the security process is not executed. It is because electric characteristics of the IC card at a power voltage 3V have been specified to maximum 50 mA in the normal operating mode and to maximum 0.5 mA in the clock stop state on the basis of the ISO/IEC 7816-3 standard. The sleep mode is an operating mode in which even if the clock supply is stopped, by supplying even the power source, the internal state (data held in a register or a RAM of a core CPU) of the IC card chip 150 is held.

The controller chip 120 has a function such that a clock signal which is supplied to the IC card chip 150 via the clock input terminal of the IC card chip 150 is generated in the MMC 110 and its frequency, supply start timing, and supply stop timing are controlled. According to the invention, since the operation can be made to have no relation with the clock signal of the clock input terminal of the MMC external terminal 140, the security is improved for the attacking method called timing analysis, electric power difference analysis, or failure use analysis by the host apparatus 220.

Figure 21:
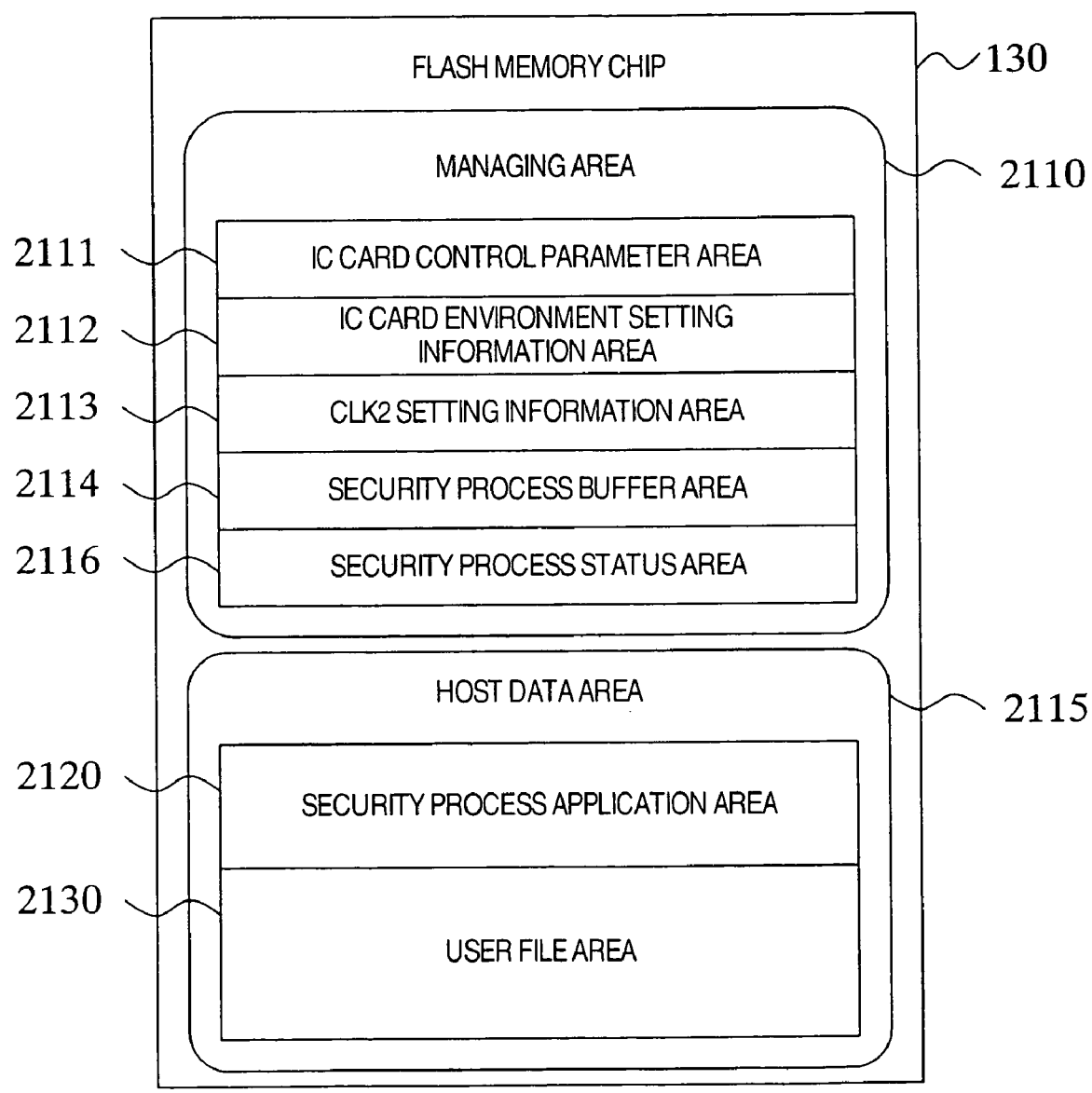
FIG. 21 is a diagram showing an internal construction of a flash memory chip.

FIG. 21 shows a detailed internal construction of the flash memory chip 130. The flash memory chip 130 includes a host data area 2115 and a managing area 2110. The host data area 2115 is an area where logical addresses have been mapped on a sector unit basis and is an area where the host apparatus 220 can designate the logical address and read and write data. The host data area 2115 includes a user file area 2130 and a security process application area 2120. The user file area 2130 is an area where the user can freely read and write file data. The security process application area 2120 is an area where the host apparatus 220 stores data necessary for a security process application. The security process application of the host apparatus 220 logically limits the user's access lest the user illegally accesses. As data which is stored here, an application program of the host apparatus 220, dedicated data of the application, and a certificate and the like which are used in the security process (for example, an electronic fund transfer application program, electronic fund transfer log information, an electronic fund transfer service certificate, etc.) can be stored. According to the invention, in place of the host apparatus 220, the MMC 110 stores the data which is used when the host apparatus 220 executes the security process, so that usability is improved for the host apparatus 220. The managing area 2110 is an area for storing information for allowing the controller chip 120 to manage the IC card chip 150. The managing area 2110 includes an IC card control parameter area 2111, an IC card environment setting information area 2112, a CLK2 setting information area 2113, a security process buffer area 2114, and a security process status area 2116. A detailed using method of the areas 2111 to 2116 will be described hereinlater.

The controller chip 120 uses the security process buffer area 2114 in the managing area 2110 of the flash memory chip 130 as a main memory or a buffer memory at the time of executing the security process in the IC card chip 150. When the host apparatus 220 accesses the MMC 110 by the command for executing the security process, if the MMC 110 receives security related data of a large size in which it cannot be transmitted in the lump to the IC card chip 150 from the host apparatus 220, the controller chip 120 selects the access to the flash memory chip 130 and temporarily stores the data into the security process buffer area 2114 having an enough large capacity. The size in which the data cannot be transmitted in the lump to the IC card chip 150 is a size exceeding a permissible data size (for example, 255 bytes or 256 bytes) of the IC card command. The controller chip 120 divides the data into data of a size in which the data can be transmitted to the IC card chip 150, reads out the divided data from the flash memory chip 130, and transmits them to the IC card chip 150 step by step. That is, the read/write of the divided data are repeated. According to the invention, since the security related data of a large size can be handled for the host apparatus 220, usability of the security process is improved.

With respect to the managing area 2110 including the security process buffer area 2114, the host access is physically limited by the controller chip 120 so that the host apparatus 220 cannot illegally access it and analyze the security process. That is, that the host apparatus 220 cannot directly write and read data into/from the managing area 2110. According to the invention, since the host apparatus 220 cannot freely read out and alter the contents in the security process buffer area 2114, the reliability and safety of the security process are improved.

Figure 23:
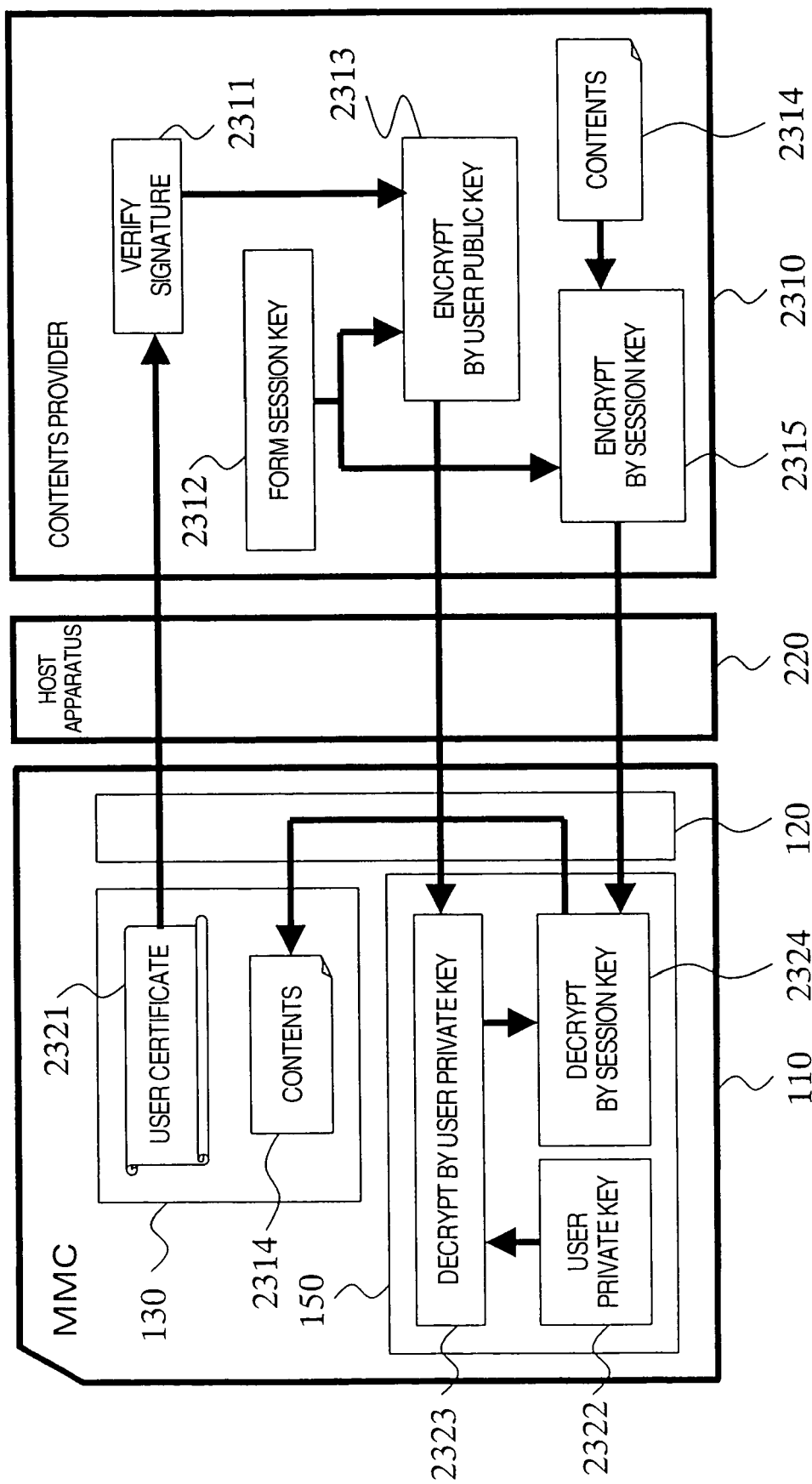
FIG. 23 is a diagram showing an example in which the MMC to which the invention is applied is applied to contents distribution.

FIG. 23 shows a security process of content distribution as an example of the security process using the MMC 110. A content provider 2310 is a dealer who sells content 2314 to the user who owns the MMC 110. In this example, the host apparatus 220 is a terminal which can be connected to the content provider 2310 via a network or the like. The user connects the MMC 110 to the host apparatus 220 and purchases the content 2314. Its procedure will be described hereinbelow.

First, the host apparatus 220 issues a command for reading out a user certificate 2321 stored in the flash memory chip 130 to the MMC 110. The controller chip 120 of the MMC 110 reads out the user certificate 2321 stored in the security process application area 2120 of the flash memory chip 130 and transmits it to the host apparatus 220. The host apparatus 220 transmits it to the content provider 2310. The content provider 2310 verifies a digital signature appended to the user certificate 2321 (2311). If the verification is successful, a session key is formed by a random number generator (2312) and it is encrypted by a user public key extracted from the user certificate 2321 (2313). Further, the content 2314 is encrypted by the session key (2315). The content provider 2310 transmits a result of step 2313 to the host apparatus 220. The host apparatus 220 issues the command for requesting the security process for decrypting the result of step 2313 by a user private key 2322 to the MMC 110. The controller chip 120 issues the IC card command for decrypting the result of step 2313 by the user private key 2322 to the IC card chip 150. The IC card chip 150 decrypts the result of step 2313 by the user private key 2322 and obtains the session key (2323). The host apparatus 220 issues a command for outputting information showing whether the decrypting process is successful or not to the MMC 110. The controller chip 120 constructs information which is obtained by the host apparatus 220 on the basis of a decryption result (IC card response showing whether the decrypting process is successful or not) which is outputted from the IC card chip 150. The MMC 110 transmits the information to the host apparatus 220. Subsequently, the content provider 2310 transmits a result of step 2315 to the host apparatus 220. The host apparatus 220 issues a command for requesting the security process for decrypting the result of step 2313 by the session key (key obtained in step 2323) to the MMC 110. The controller chip 120 issues the IC card command for decrypting the result of step 2315 by the session key to the IC card chip 150. The IC card chip 150 decrypts the result of step 2315 by the session key and reconstructs the content 2314 (2324). The controller chip 120 receives the content 2314 from the IC card chip 150 and writes it into the flash memory chip 130. The host apparatus 220 issues the command for outputting the information showing whether the decrypting process is successful or not to the MMC 110. The controller chip 120 constructs the information which is obtained by the host apparatus 220 on the basis of the decryption result (IC card response showing whether the decrypting process is successful or not) which is outputted from the IC card chip 150. The MMC 110 transmits the information to the host apparatus 220. When the host apparatus 220 notifies the content provider 2310 that the content was successfully received, the content provider 2310 charges the user written on the user certificate for a content fee. The user can read out and use the content 2314 stored in the flash memory chip 130 in the MMC 110 by the host apparatus 220. If a flash memory of a large capacity is used as a memory medium of the flash memory chip 130, the user can purchases a lot of content.

According to the invention, both of the security process and the content storage in the content distribution can be easily realized by the MMC 110. The settlement of a charge for the content can be also made by using the IC card chip 150.

Figure 24:
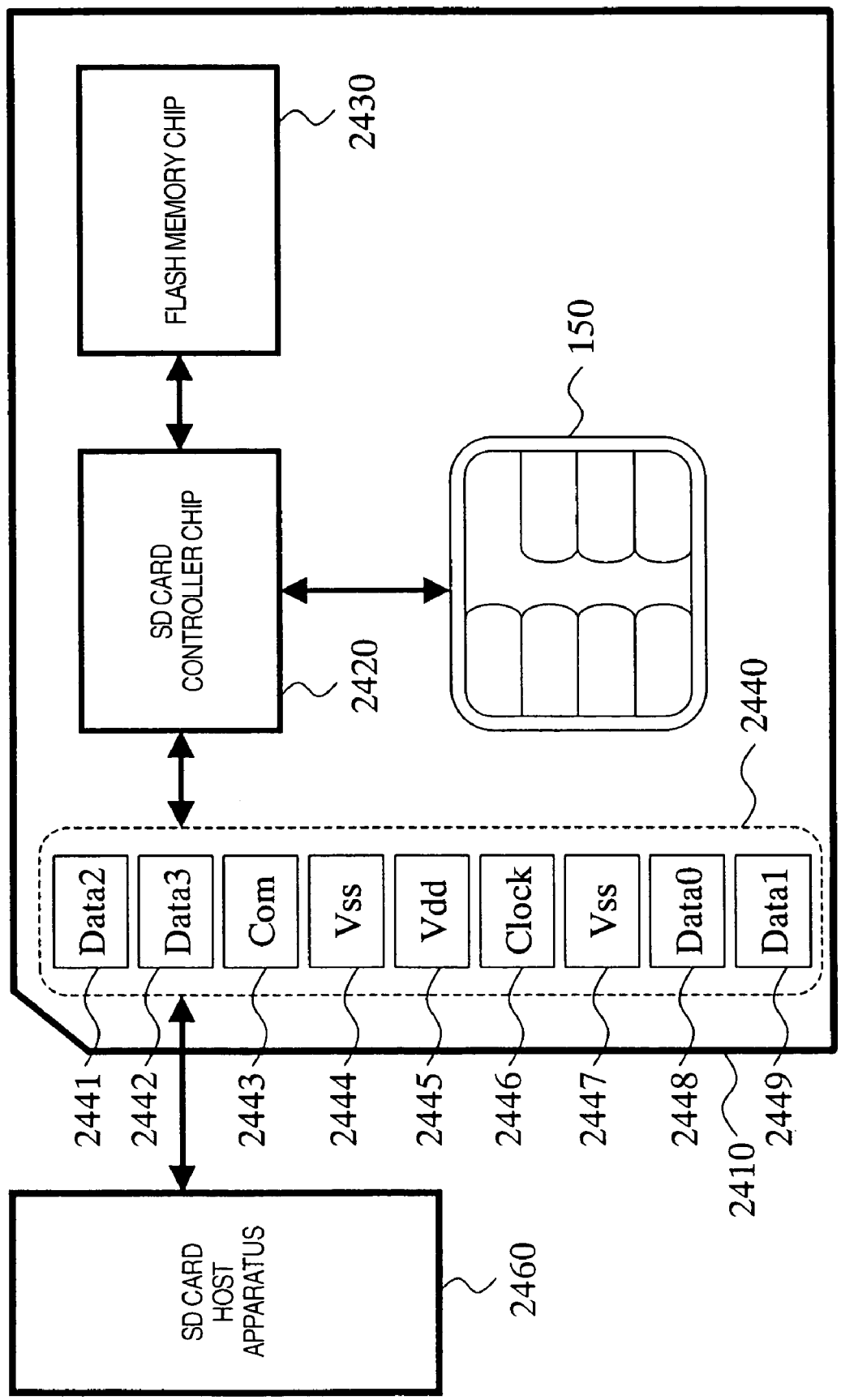
FIG. 24 is a diagram simply showing an internal construction of an SD card to which the invention is applied.

FIGS. 24 and 25 show simple internal constructional diagrams in the case where the invention is applied to an SD card (small memory card which has a width of 24 mm, a length of 32 mm, a thickness of 2.1 mm, and nine external terminals and in which a flash memory is built) and a Memory Stick (the Memory Stick is a registered trademark of Sony Corporation), respectively. An SD card 2410 to which the invention is applied includes: an SD card controller chip 2420; a flash memory chip 2430; an SD card external terminal 2440; and the IC card chip 150. A Memory Stick 2510 to which the invention is applied includes: a Memory Stick controller chip 2520; a flash memory chip 2530; a Memory Stick external terminal 2540; and the IC card chip 150. The flash memory chips 2430 and 2530 are memory chips using non-volatile semiconductor memories as memory media and data can be read and written by a flash memory command, respectively. The SD card controller chip 2420 and the Memory Stick controller chip 2520 are microcomputer chips for controlling other component elements in the SD card and the Memory Stick, respectively.

The SD card external terminal 2440 comprises nine terminals and their positions are arranged in order from the edge as a Data2 terminal 2441, a Data3 terminal 2442, a Com terminal 2443, a Vss terminal 2444, a Vdd terminal 2445, a Clock terminal 2446, a Vss terminal 2447, a Data0 terminal 2448, and a Data1 terminal 2449. The Vdd terminal 2445 is a power supply terminal. The Vss terminals 2444 and 2447 denote ground terminals. The Data0 terminal 2448, Data1 terminal 2449, Data2 terminal 2441, and Data3 terminal 2442 denote data input/output terminals, respectively. The Com terminal 2443 denotes a command input/output terminal. The Clock terminal 2446 is a clock input terminal. The SD card 2410 differs from the MMC 110 with respect to specifications of an interface with an SD card host apparatus 2460 which is connected to the outside. However, since the SD card 2410 has a feature such that external terminals which are very similar to the MMC external terminal 140 and it operates by issuing a command from the outside in a manner similar to the MMC 110, the invention can be applied.

The Memory Stick external terminal 2540 comprises ten terminals and their positions are arranged in order from the edge as a Gnd terminal 2541, a BS terminal 2542, a Vcc terminal 2543, a DIO terminal 2544 (one reservation terminal Rsv is skipped), an INS terminal 2545, an SCK terminal 2546 (one reservation terminal Rsv is skipped), a Vcc terminal 2547, and a Gnd terminal 2548. The Vcc terminals 2543 and 2547 are power supply terminals. The Gnd terminals 2541 and 2548 denote ground terminals. The DIO terminal 2544 denotes a command and data input/output terminal. The SCK terminal 2546 is a clock input terminal. The Memory Stick 2510 differs from the MMC 110 with respect to specifications of an interface with a Memory Stick host apparatus 2560 which is connected to the outside. However, since the Memory Stick 2510 has a feature such that it operates by issuing a command from the outside in a manner similar to the MMC 110, the invention can be applied.

Figure 1:
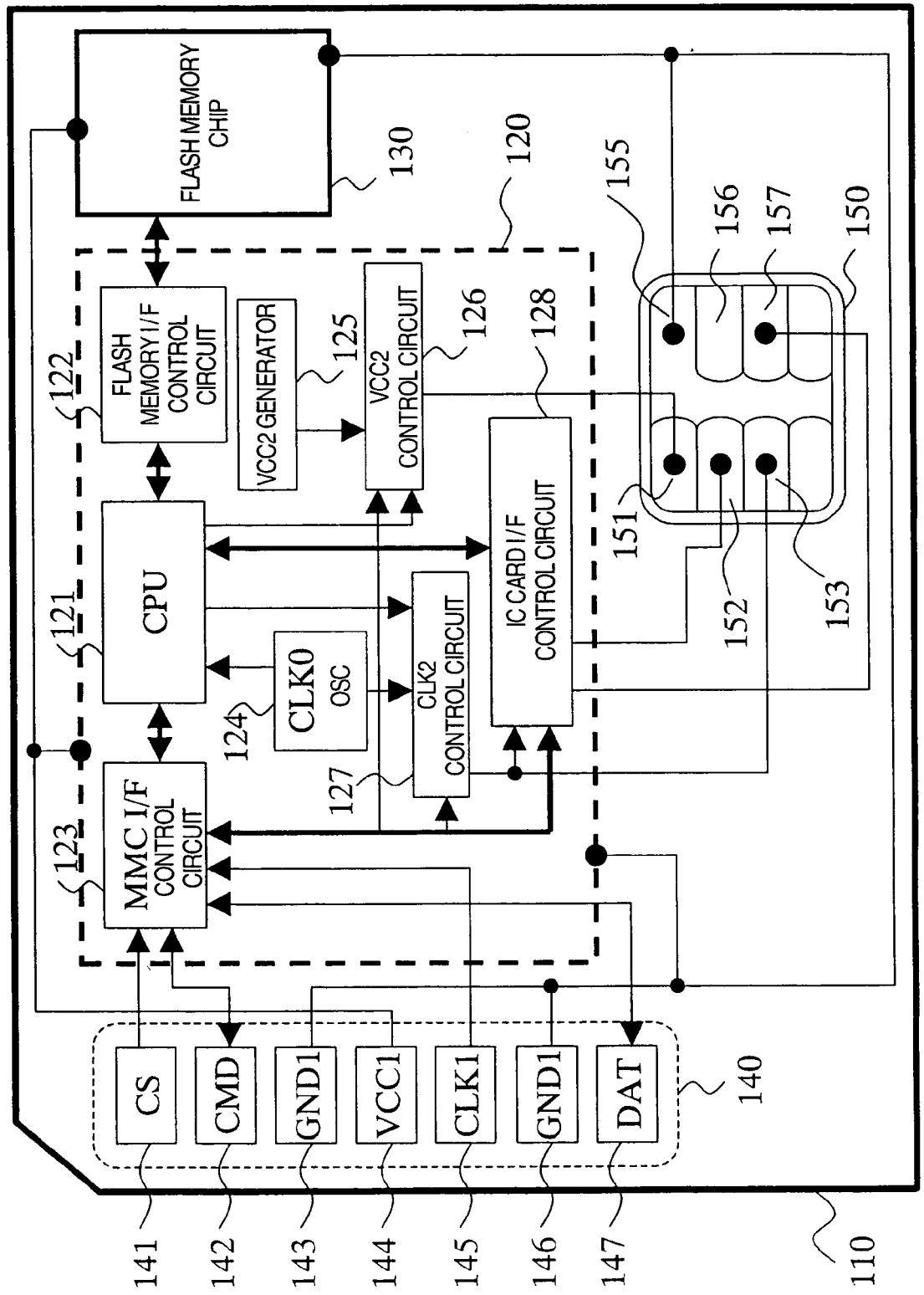
FIG. 1 is a diagram showing an internal construction of an MMC to which the invention is applied.
Figure 2:
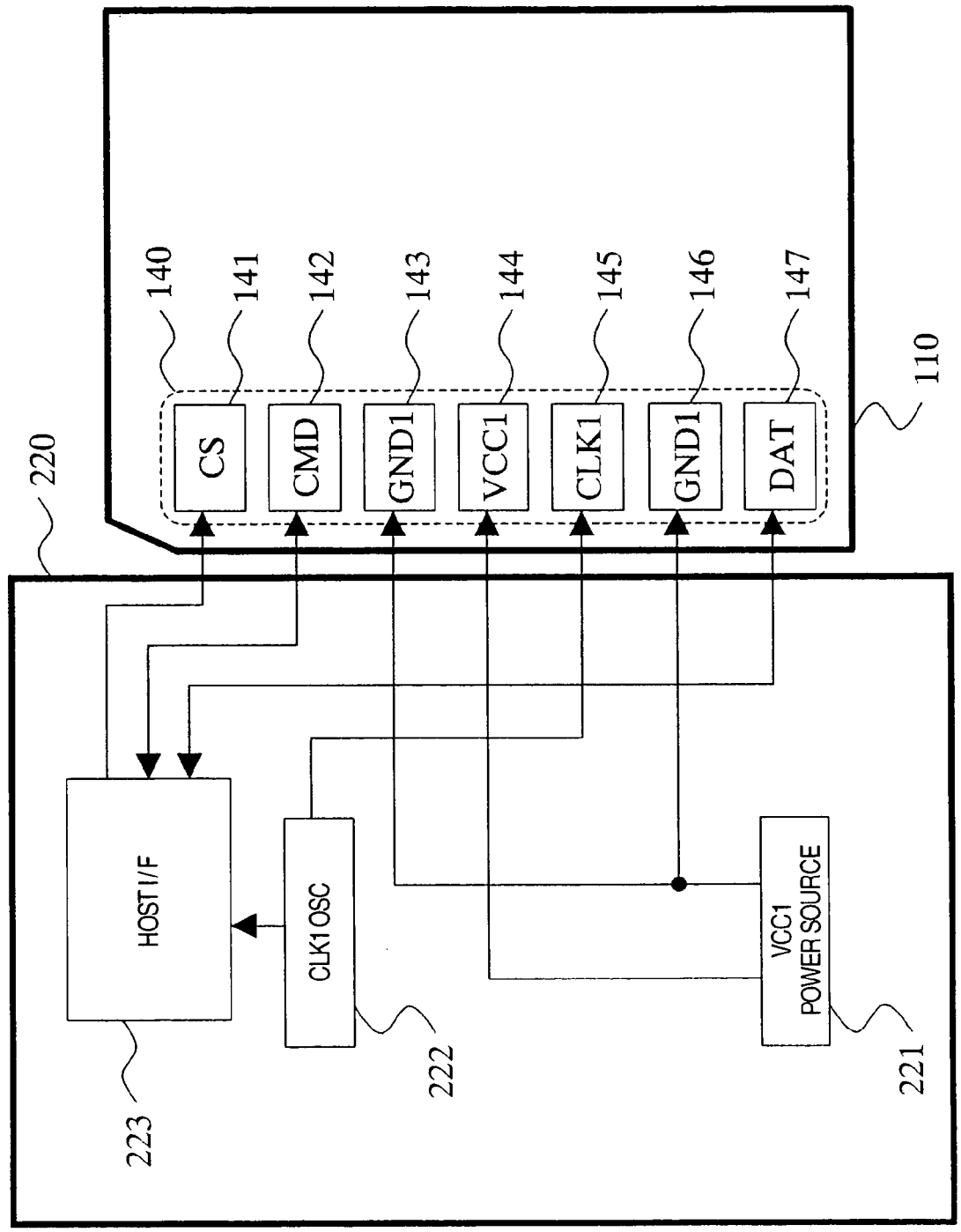
FIG. 2 is a diagram showing an internal construction of a host apparatus of the MMC to which the invention is applied and a connecting state of the host apparatus and the MMC.

FIG. 1 is shows a detailed internal constructional diagram of the MMC to which the invention is applied. FIG. 2 shows a construction of the host apparatus 220 connected to the MMC 110 in FIG. 1 and its connecting state. The host apparatus 220 has a VCC1 power source 221, a CLK1 oscillator 222, and a host interface 223.

The MMC 110 has the MMC external terminal 140 for exchanging information with the external host apparatus 220. The MMC external terminal 140 includes seven terminals comprising a CS terminal 141, a CMD terminal 142, a GND1 terminals 143 and 146, a VCC1 terminal 144, a CLK1 terminal 145, and a DAT terminal 147. The Multi Media Card specifications specify two kinds of operating modes of the MMC such as MMC mode and SPI mode. Using methods of the MMC external terminal 140 are different in dependence on the operating mode. In the embodiment, the case of the operation in the MMC mode will be described in detail. The VCC1 terminal 144 is connected to the VCC1 power source 221 and is a power source terminal for supplying electric power to the MMC 110 from the host apparatus 220. The GND1 terminals 143 and 146 are connected to the VCC1 power source 221 and are electric ground terminals of the MMC 110. The GND1 terminals 143 and 146 are electrically short-circuited in the MMC 110. The CS terminal 141 is connected to the host interface 223 and is an input terminal which is used in the operation in the SPI mode. When the host apparatus 220 accesses the MMC 110 in the SPI mode, an L-level signal is inputted to the CS terminal 141. In the operation in the MMC mode, there is no need to use the CS terminal 141. The CMD terminal 142 is connected to the host interface 223 and is an input/output terminal which is used when the host apparatus 220 transmits a memory card command according to the memory card interface specifications to the MMC 110 or receives a memory card response according to the above specifications from the MMC 110. The DAT terminal 147 is connected to the host interface 223 and is an input/output terminal which is used when the host apparatus 220 transmits input data in a format according to the memory card I/F specifications to the MMC 110 or receives output data in a format according to the above specifications from the MMC 110. The CLK1 terminal 145 is connected to the CLK1 oscillator 222 and is a terminal to which the clock signal which is generated by the CLK1 oscillator 222 is inputted. When the host apparatus 220 transmits and receives the memory card command and the memory card response via the CMD terminal 142 or transmits and receives the host data via the DAT terminal 147, the clock signal is inputted to the CLK1 terminal 145. The clock signal is supplied to the host interface 223 from the CLK1 oscillator 222. The memory card command, the memory card response, and the host data are transferred between the host apparatus 220 and the MMC 110 synchronizing with the clock signal which is generated by the CLK1 oscillator 222 on a bit unit basis.

The MMC 110 has the controller chip 120. The controller chip 120 includes: a CPU 121; a flash memory I/F control circuit 122; an MMC I/F control circuit 123; a CLK0 oscillator 124; a VCC2 generator 125; a VCC2 control circuit 126; a CLK2 control circuit 127; and an IC card I/F control circuit 128. Those component elements 121 to 128 are made operative by electric power supplied from the host apparatus 220 via the VCC1 terminal 144 and the GND1 terminals 143 and 146. The MMC I/F control circuit 123 is connected to the CS terminal 141, CMD terminal 142, CLK1 terminal 145, and DAT terminal 147 and is a logic circuit for controlling the interface which is used when the MMC 110 exchanges information with the host apparatus 220 via those terminals. The CPU 121 is connected to the MMC I/F control circuit 123 and controls the MMC I/F control circuit 123. When the MMC I/F control circuit 123 receives the memory card command from the host apparatus 220 via the CMD terminal 142, the MMC I/F control circuit 123 transmits a response to the host apparatus 220 via the CMD terminal 142 in order to notify the host apparatus 220 of a result showing whether the reception of the command is successful or not. The CPU 121 interprets the received memory card command and executes a process according to contents of the command. If it is necessary to transmit and receive data to/from the host apparatus 220 via the DAT terminal 147 in accordance with the command contents, the CPU 121 transmits the data to the MMC I/F control circuit 123 and obtains the data from the MMC I/F control circuit 123. Further, the CPU 121 also controls a data transfer procedure between the MMC I/F control circuit 123 and the host apparatus 220. For example, the CPU 121 outputs an L-level signal to the DAT terminal 147 and notifies the host apparatus 220 that the MMC 110 is busy so that the host apparatus 220 does not stop the power supply to the MMC 110 during the process of the data received from the host apparatus 220. The CLK0 oscillator 124 is connected to the CPU 121 and supplies drive clocks for making the CPU 121 operative. Although the IC card chip 150 needs the drive clocks, the flash memory chip 130 does not need the drive clocks. However, both of the IC card chip 150 and the flash memory chip 130 need data transfer clocks for transferring the data.

The MMC 110 has the flash memory chip 130. The flash memory chip 130 is a memory chip using a non-volatile semiconductor memory as a memory medium. The flash memory chip 130 is made operative by electric power supplied from the host apparatus 220 via the VCC1 terminal 144 or the GND1 terminals 143 and 146. The flash memory chip 130 has a writing function for storing the inputted data into the non-volatile semiconductor memory and a reading function for outputting the data stored in this memory to the outside in accordance with a flash memory command which is inputted from the outside. The flash memory I/F control circuit 122 is a logic circuit for issuing the flash memory command to the flash memory chip 130 and transferring data which is inputted/outputted by such a command. The CPU 121 controls the flash memory I/F control circuit 122 so as to allow the flash memory chip 130 to execute the writing or reading function of the data. When it is necessary that the data received from the host apparatus 220 is written into the flash memory chip 130 or the data stored in the flash memory chip 130 is transmitted to the host apparatus 220, the CPU 121 controls the data transfer between the flash memory I/F control circuit 122 and the MMC I/F control circuit 123.

The MMC 110 has the IC card chip 150. The IC card chip 150 is an IC chip designed to be embedded into the substrate of the IC card and has eight external terminals which comply with the external terminal standard of the IC card. How to use has been assigned to the six terminals among them in accordance with the external terminal standard of the IC card and the remaining two terminals are spare terminals for future use. The six terminals are a VCC2 terminal 151, an RST terminal 152, a CLK2 terminal 153, a GND2 terminal 155, a VPP terminal 156, and an I/O terminal 157.

The ground terminal of the IC card chip 150 is connected to the GND1 (ground terminal) 146 of the MMC external terminal 140. The VCC2 terminal (power input terminal) 151 of the IC card chip 150 is connected to the VCC2 control circuit 126 of the controller chip 120. The RST terminal (reset input terminal) 152 and the I/O terminal (data input/output terminal) 157 of the IC card chip 150 are connected to the IC card I/F control circuit 128 of the controller chip 120. The CLK2 terminal (clock input terminal) 153 of the IC card chip 150 is connected to the CLK2 control circuit 127 of the controller chip 120.

The VCC terminal (power input terminal) of the flash memory chip 130 is connected to the VCC1 144 of the MMC external terminal 140. The VSS terminal (ground terminal) of the flash memory chip 130 is connected to the GND1 146 of the MMC external terminal 140. The I/O terminal (data input/output terminal), a ready/busy terminal, a chip enable terminal, an output enable terminal, a write enable terminal, a clock terminal, and a reset terminal of the flash memory chip 130 are connected to the flash memory I/F control circuit 122 of the controller chip 120.

The VCC2 terminal 151 is a power source terminal for supplying electric power to the IC card chip 150. The VCC2 control circuit 126 is a circuit for controlling the start and stop of the supply of the electric power to the VCC2 terminal 151 by a switching circuit using a MOS-FET device. The VCC2 generator 125 generates a voltage which is supplied to the VCC2 terminal 151 and supplies it to the VCC2 control circuit 126. The electric signal standard of the IC card specifies Class A and Class B as operation classes of the IC card. A standard voltage which is supplied to the VCC2 terminal 151 is equal to 5V in Class A and to 3V in Class B. Although the present invention can be applied irrespective of the operation class of the IC card chip 150, a case where the IC card chip 150 operates in Class B will be described in detail in the embodiment. The VPP terminal 156 is a terminal for supplying a variable voltage which is used for writing or erasing data into/from the internal non-volatile memory when the IC card chip 150 operates in Class A. The VPP terminal 156 is not used when the IC card chip 150 operates in Class B. The GND2 terminal 155 is an electric ground terminal of the IC card chip 150 and is short-circuited to the GND1 terminals 143 and 146. The VCC2 control circuit 126 is connected to the CPU 121 and the CPU 121 can control the start and stop of the power supply to the VCC2 terminal 151. When the IC card chip 150 is not used, the CPU 121 can stop the power supply to the VCC2 terminal 151. By stopping the power supply to the IC card chip 150, the MMC 110 can save electric power which is consumed by the IC card chip 150. However, if the power supply is stopped, an internal state of the IC card chip 150 is not maintained except for the data stored in the non-volatile memory in the IC card chip 150.

The CLK2 terminal 153 is a terminal for inputting a clock signal to the IC card chip 150. The CLK2 control circuit 127 is a circuit for supplying clocks to the CLK2 terminal 153. The CLK2 control circuit 127 generates the clock signal which is supplied to the CLK2 terminal 153 on the basis of the clock signal which is supplied from the CLK0 oscillator 124. The CLK2 control circuit 127 is connected to the CPU 121 and can control the start and stop of the supply of the clocks to the CLK2 terminal 153 from the CPU 121. The IC card chip 150 does not have a drive clock oscillator in itself. Therefore, the IC card chip 150 is made operative by supplying the drive clocks from the CLK2 terminal 153. When the CLK2 control circuit 127 stops the clock supply to the CLK2 terminal 153, since the operation of the IC card chip 150 stops, the electric power consumption of the IC card chip 150 can be saved. At this time, if the power supply to the VCC2 terminal 151 is held, the internal state of the IC card chip 150 is maintained. If a frequency of the clock signal which is supplied to the CLK2 terminal 153 is assumed to be F2, a frequency of the clock signal which is supplied from the CLK0 oscillator 124 is assumed to be F0, and P and Q are assumed to be positive integers, the CLK2 control circuit 127 forms a clock signal which satisfies a relation $F2=(P/Q)*F0$ and supplies it to the CLK2 terminal 153. Values of P and Q can be set by the CPU 121. If F2 is increased by setting P to a large value, an internal process of the IC card chip 150 can be driven at a higher speed. If F2 is decreased by setting Q to a large value, the internal process of the IC card chip 150 is driven at a lower speed, so that the electric power consumption of the IC card chip 150 can be saved. A drive clock frequency of the IC card chip 150 needs to be set to a value within an allowable frequency range in which the IC card chip 150 can operate correctly. For this purpose, the CLK2 control circuit 127 has a feature such that the values of P and Q by which the value of F2 is out of the allowable frequency range are not set.

The I/O terminal 157 is an input/output terminal which is used when the IC card command is inputted to the IC card chip 150 or the IC card chip 150 outputs the IC card response. The IC card I/F control circuit 128 is connected to the I/O terminal 157 and is a circuit for performing the signal transmission of the IC card command and the signal reception of the IC card response via the I/O terminal 157. The IC card I/F control circuit 128 is connected to the CPU 121. The CPU 121 controls procedures for transmission and reception of the IC card command and the IC card response which are executed by the IC card I/F control circuit 128, sets the IC card command data to be transmitted into the IC card I/F control circuit 128, or obtains the received IC card response from the IC card I/F control circuit 128. The clock is supplied from the CLK2 control circuit 127 to the IC card I/F control circuit 128. The IC card command and the IC card response are transmitted and received via the I/O terminal 157 synchronizing with the clock signal, on a bit unit basis, which is supplied to the CLK2 terminal 153. The RST terminal 152 is a terminal for inputting a reset signal when the IC card chip 150 is reset. The IC card I/F control circuit 128 is connected to the RST terminal 152 and can send the reset signal to the IC card chip 150 by an instruction from the CPU 121.

Figure 3:
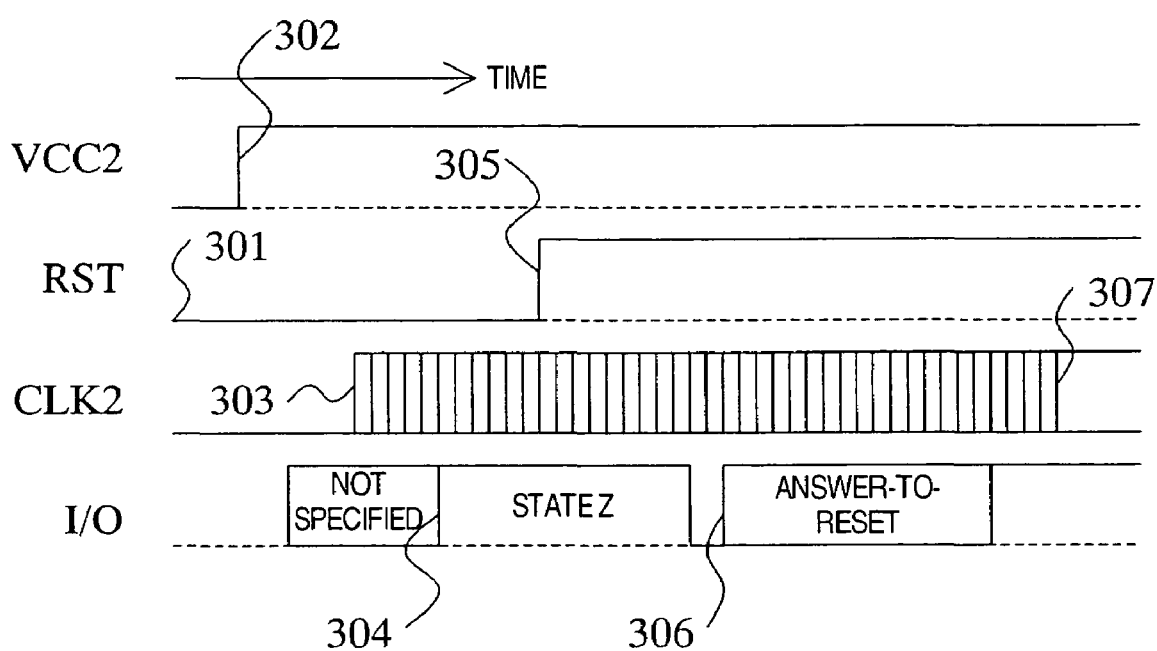
FIG. 3 is a diagram showing signal waveforms upon cold resetting of an IC card chip.
Figure 4:
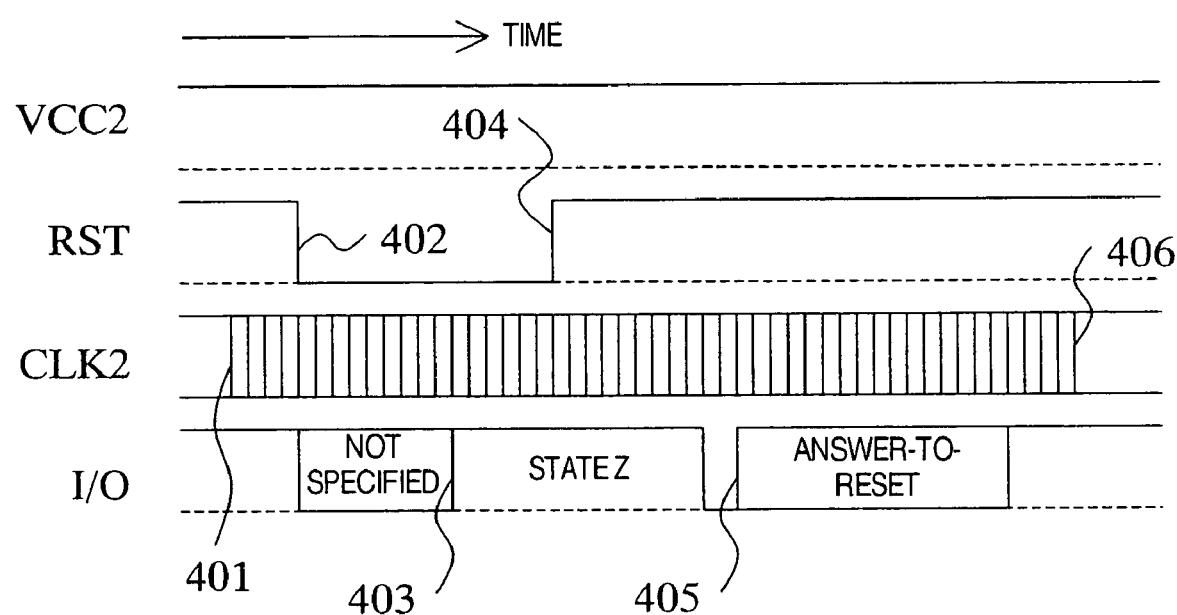
FIG. 4 is a diagram showing signal waveforms upon warm resetting of the IC card chip.
Figure 5:
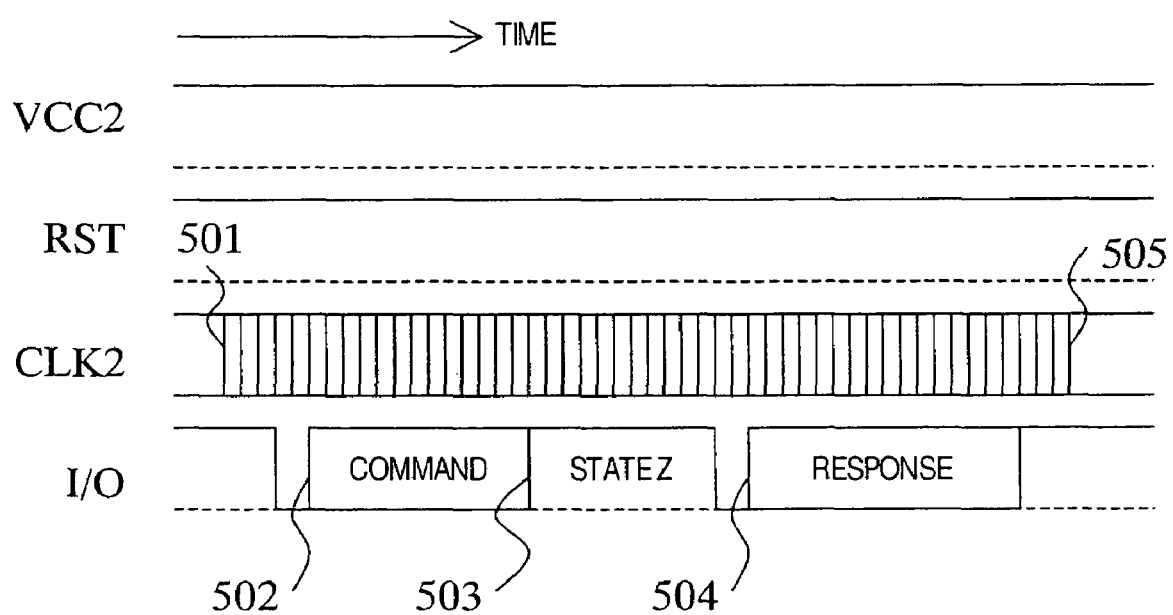
FIG. 5 is a diagram showing signal waveforms upon IC card command processing of the IC card chip.
Figure 6:
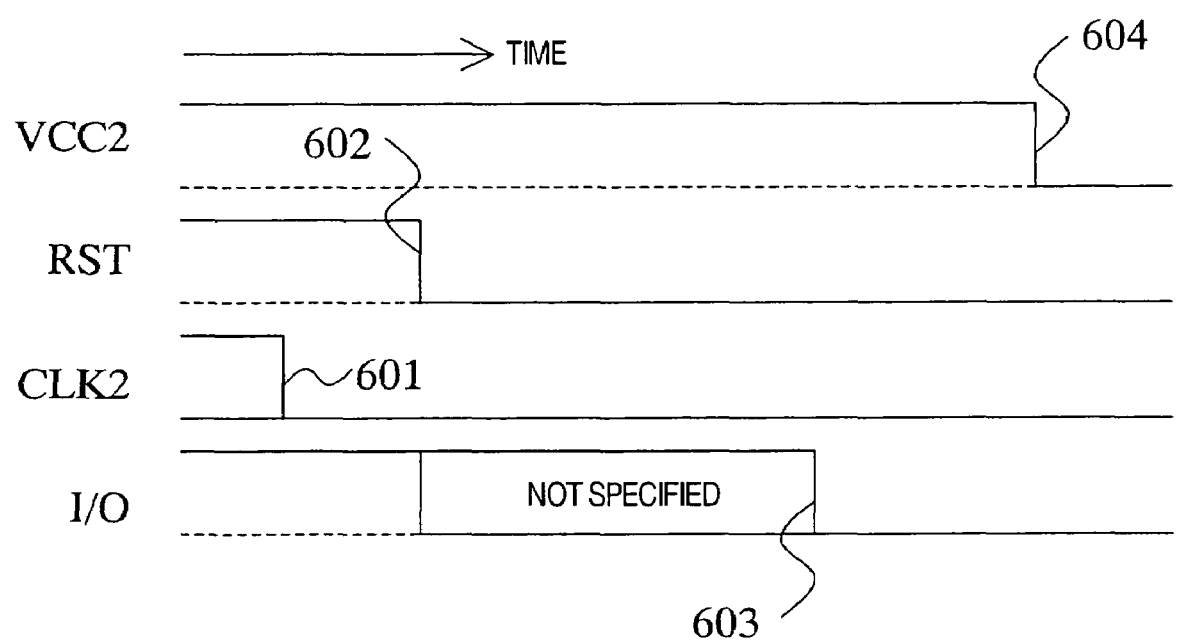
FIG. 6 is a diagram showing signal waveforms upon inactivation of the IC card chip.

The IC card chip 150 exchanges information on the basis of the electric signal standard or command standard of the IC card. There are four kinds of access patterns to the IC card chip 150 and each pattern will be explained by using FIGS. 3 to 6. FIG. 3 simply shows signal waveforms at the external terminals of the IC card chip 150 in a process in which the IC card chip 150 is activated from an inactive state (state where the power source is shut off) and initializes the internal state by an instruction from the CPU 121 (such a process is called a "cold reset" hereinbelow). FIG. 4 simply shows signal waveforms at the external terminals of the IC card chip 150 in a process in which the IC card chip 150 initializes the internal state in an active state (state where the power source is supplied) by an instruction from the CPU 121 (such a process is called a "warm reset" hereinbelow). FIG. 5 simply shows signal waveforms at the external terminals of the IC card chip 150 in a process in which the IC card command is transmitted to the IC card chip 150 and the IC card response is received from the IC card chip 150 by an instruction from the CPU 121. FIG. 6 simply shows signal waveforms at the external terminals of the IC card chip 150 in a process in which the IC card chip 150 is inactivated by an instruction from the CPU 121. In FIGS. 3 to 6, the time is directed from left to right and the signals which are obtained at the VCC2 terminal 151, RST terminal 152, CLK2 terminal 153, and I/O terminal 157 are shown from the upper row toward the lower row. A broken line indicates a base (L level) of each signal.

The cold reset operation of the IC card chip 150 will be described with reference to FIG. 3. First, the IC card I/F control circuit 128 sets the RST terminal 152 to the L level (301). Subsequently, the VCC2 control circuit 126 starts the power supply to the VCC2 terminal (302). Subsequently, the CLK2 control circuit 127 starts the supply of the clock signal to the CLK2 terminal 153 (303). Subsequently, the IC card I/F control circuit 128 sets the I/O terminal 157 into a state Z (pulled-up condition) (304). Subsequently, the IC card I/F control circuit 128 sets the RST terminal 152 to the H level (305). Subsequently, the IC card I/F control circuit 128 starts the reception of an answer-to-reset which is outputted from the I/O terminal 157 (306). After completion of the reception of the answer-to-reset, the CLK2 control circuit 127 stops the supply of the clock signal to the CLK2 terminal 153 (307). The cold reset operation is completed in this manner. Step 307 is a device to reduce the electric power consumption and can be omitted.

The warm reset operation of the IC card chip 150 will be described with reference to FIG. 4. First, the CLK2 control circuit 127 starts the supply of the clock signal to the CLK2 terminal 153 (401). Subsequently, the IC card I/F control circuit 128 sets the RST terminal 152 to the L level (402). Subsequently, the IC card I/F control circuit 128 sets the I/O terminal 157 into the state Z (403). Subsequently, the IC card I/F control circuit 128 sets the RST terminal 152 to the H level (404). Subsequently, the IC card I/F control circuit 128 starts the reception of the answer-to-reset which is outputted from the I/O terminal 157 (405). After completion of the reception of the answer-to-reset, the CLK2 control circuit 127 stops the supply of the clock signal to the CLK2 terminal 153 (406). The warm reset operation is completed in this manner. Step 406 is a device to reduce the electric power consumption and can be omitted.

The operation for transmitting the IC card command to the IC card chip 150 and receiving the IC card response from the IC card chip 150 will be described with reference to FIG. 5. First, the CLK2 control circuit 127 starts the supply of the clock signal to the CLK2 terminal 153 (501). If the clock has already been supplied, step 501 is unnecessary. Subsequently, the IC card I/F control circuit 128 starts the transmission of the command data to the I/O terminal 157 (502). After completion of the transmission of the command data, the IC card I/F control circuit 128 sets the I/O terminal 157 into the status Z (503). Subsequently, the IC card I/F control circuit 128 starts the reception of the response data which is outputted from the I/O terminal 157 (504). After completion of the reception of the response data, the CLK2 control circuit 127 stops the supply of the clock signal to the CLK2 terminal 153 (505). The operation of the transmission of the IC card command and the reception of the IC card response is completed in this manner. Step 505 is a device to reduce the electric power consumption and can be omitted.

The operation for inactivating the IC card chip 150 will be described with reference to FIG. 6. First, the CLK2 control circuit 127 sets the CLK2 terminal 153 to the L level (601). Subsequently, the IC card I/F control circuit 128 sets the RST terminal 152 to the L level (602). Subsequently, the IC card I/F control circuit 128 sets the I/O terminal 157 to the L level (603). Finally, the VCC2 control circuit 126 stops the power supply to the VCC2 terminal (604). The inactivating operation is completed in this manner.

When the IC card chip 150 stops (for example, a state where the security process is not executed, or the like), it is also possible to stop only the supply of the clocks while maintaining the power supply from the controller chip 120 to the IC card chip 150.

The IC card chip 150 has a security processing function for executing a cryptographic operation which is necessary for protection of secret data, personal identification, or the like. The IC card chip 150 exchanges information by transmitting and receiving the IC card command and the IC card response to/from the CPU 121, thereby consequently executing the transmission of the calculation result and the stored information, a change in stored information, or the like. The CPU 121 can execute the security process by using the IC card chip 150. When the MMC 110 receives a specific memory card command from the host apparatus 220, by using the command reception as a trigger, the CPU 121 controls the power supply to the IC card chip 150 via the VCC2 control circuit 126, controls the clock supply to the IC card chip 150 via the CLK2 control circuit 127, or transmits the IC card command to the IC card chip 150 via the IC card I/F control circuit 128. Thus, the CPU 121 executes the security process required by the host apparatus 220 by using the IC card chip 150. The CPU 121 can also execute the security process by operating a combination of plural operations such as power supply control, clock supply control, IC card command transmission, and IC card response reception to/from the IC card chip 150 by using the reception of the specific memory card command as a trigger. When the host apparatus 220 starts the power supply to the MMC 110, the CPU 121 can also execute the security process by using the start of the power supply as a trigger. A result of the security process is constructed on the basis of the IC card response which is outputted by the IC card chip 150 and held in the MMC 110. When the MMC 110 receives the specific memory card command from the host apparatus 220, the CPU 121 transmits the result of the security process to the host apparatus 220 by using the reception as a trigger.

FIG. 7 shows a flowchart at the time when the host apparatus 220 accesses the MMC 110. First, the host apparatus 220 starts the power supply to the VCC1 terminal 144 in order to activate the MMC 110 (701). The MMC 110 executes a primary IC card initializing process by using it as a trigger (702). Details of the primary IC card initializing process will be explained hereinlater. Subsequently, the host apparatus 220 transmits an initializing command of the MMC 110 via the CMD terminal 142 in order to initialize the MMC 110 (703). The initializing command complies with the Multi Media Card specifications and there are plural kinds of initializing commands. There is a case where the host apparatus 220 transmits plural initializing commands in order to initialize the MMC 110. When the MMC 110 receives the initializing commands, the MMC 110 processes them (704). The MMC 110 executes a secondary IC card initializing process by using it as a trigger (705). Details of the secondary IC card initializing process will be explained hereinlater. The host apparatus 220 receives a memory card response to the initializing commands of the MMC 110 via the CMD terminal 142 and discriminates whether the initialization of the MMC 110 has been completed or not from the contents of the memory card response. If it is not completed yet, the initializing commands are transmitted again (703). After completion of the initialization of the MMC 110, the host apparatus 220 enters a mode for waiting for transmission of a standard memory card command (command for accessing the flash memory chip 130) complying with the Multi Media Card specifications and the specific memory card command (command for accessing the IC card chip 150) concerning the foregoing security process (707). In the waiting mode, the host apparatus 220 can transmit the standard memory card command (708). When the MMC 110 receives the standard memory card command, the MMC 110 processes it (709). After completion of the process, the host apparatus 220 is returned to the waiting mode again (707). In this waiting mode, the host apparatus 220 can also transmit a security processing request write command (710). The security processing request write command is one kind of specific memory card commands concerned with the foregoing security process and is a memory card command for transmitting a processing request for allowing the MMC 110 to execute the security process. When the MMC 110 receives the security processing request write command, the CPU 121 interprets the contents of the requested security process and describes the security process in a format of the IC card command (711). That is, the CPU 121 converts the standard memory card command from the host apparatus 230 into a specific memory card command which can be interpreted by the IC card chip 150 in accordance with a predetermined rule. The requested security process is executed by issuing an IC card command thus obtained to the IC card chip 150, or the like (712). After completion of the process, the host apparatus 220 is returned to the waiting mode again (707). In the waiting mode, the host apparatus 220 can also transmit a security processing result read command (713). The security processing result read command is one kind of specific memory card commands concerned with the foregoing security process and is a memory card command for receiving a processing result to know a result of execution by the MMC 110. When the MMC 110 receives the security processing result read command, the CPU 121 constructs the security processing result to be transmitted to the host apparatus 220 on the basis of the IC card response received from the IC card chip 150 (714). The host apparatus 220 receives the security processing result from the MMC 110. After completion of the reception, the host apparatus 220 is returned to the waiting mode again (707). Step 714 can be also executed in step 712.

In FIG. 7, the primary IC card initializing process and the secondary IC card initializing process which are executed in steps 702 and 705 are processes in which the CPU 121 accesses the IC card chip 150 in preparation for execution of the security process in the MMC 110. Specifically speaking, the activation or inactivation of the IC card chip 150, the reset of the IC card chip 150, and the environment setting of the IC card chip 150 are executed. The environment setting denotes that information which is necessary for executing the security process (for example, information of a cryptography algorithm which can be used, information regarding a private key and a public key which are used in the cryptographic calculation, information regarding authentication data which is used for personal identification, etc.) is read out from the IC card chip 150 or written into the IC card chip 150. The environment setting of the IC card chip 150 is performed by issuing N-time (N is a positive integer) IC card commands to the IC card chip 150. For example, if three session keys are necessary, the IC card command is issued three times and if two session keys are necessary, the IC card command is issued twice. The N-time IC card commands can be different or identical. A value of N is not fixed but varies depending on circumstances. The IC card command which is issued in the environment setting is called a setting command hereinbelow. The IC card command for executing the security process on the basis of the environment setting is called a security command hereinbelow. As examples of the security command, there are commands for executing a calculation of a digital signature, a verification of the digital signature, an encryption of a message, a decryption of the encrypted message, an authentication by a password, and the like.

The CPU 121 can freely change the contents of the environment setting of the IC card chip 150. The CPU 121 can change the contents in accordance with the contents or result of the security process or can change them by using the reception of the memory card command from the host apparatus as a trigger. The CPU 121 can also write information showing the contents of the environment setting into the flash memory chip 130 or read out the information from the flash memory chip 130 and use it as necessary. Such information is shown as IC card environment setting information 2112 in FIG. 21. Thus, even if the MMC 110 is inactivated, its information can be held. Troublesomeness of new setting necessary each time the MMC 110 is activated can be omitted.

The primary IC card initializing process and the secondary IC card initializing process are executed on the basis of values set in IC card control parameters A, B, and C. In the security process which is executed in step 712, the CPU 121 controls the activation and inactivation of the IC card chip 150 on the basis of a value set in an IC card control parameter D. FIG. 8 shows kinds and set values of IC card control parameters and contents of processes corresponding to them. First, the parameter A is a parameter regarding the primary IC card initializing process which is executed when the power source is supplied to the MMC 110. When A=0, the CPU 121 does not access the IC card chip 150. When A=1, the CPU 121 cold-resets the IC card chip 150. When A=2, the CPU 121 cold-resets the IC card chip 150 and, thereafter, makes the environment setting of the IC card chip 150. When A=3, the CPU 121 cold-resets the IC card chip 150, thereafter, makes the environment setting of the IC card chip 150, and finally inactivates the IC card chip 150. When A=0 or A=3, after completion of the primary IC card initializing process, the IC card chip 150 enters the inactive state. When A=1 or A=2, after completion of the primary IC card initializing process, the IC card chip 150 enters the active state. Subsequently, the parameters B and C are parameters regarding the secondary IC card initializing process which is executed when the MMC 110 processes an MMC initializing command. When B=0, the CPU 121 does not access the IC card chip 150. When B=1 and C=1, the CPU 121 resets (cold-resets or warm-resets) the IC card chip 150. When B=1 and C=2, the CPU 121 resets the IC card chip 150 and, thereafter, makes the environment setting of the IC card chip 150. When B=1 and C=3, the CPU 121 resets the IC card chip 150, thereafter, makes the environment setting of the IC card chip 150, and finally inactivates the IC card chip 150. When B=2 and C=2, the CPU 121 makes the environment setting of the IC card chip 150. When B=2 and C=3, the CPU 121 makes the environment setting of the IC card chip 150 and, thereafter, inactivates the IC card chip 150. When B=3, if the IC card chip 150 is in the active state, the CPU 121 inactivates the IC card chip 150. Finally, the parameter D is a parameter showing whether the IC card chip 150 is inactivated after the security process requested by the host apparatus 220 is executed or not. When D=0, after the execution of the security process, the CPU 121 does not inactivate the IC card chip 150 but holds it in the active state. When D=1, after the execution of the security process, the CPU 121 inactivates the IC card chip 150.

The CPU 121 can change the set values of the IC card control parameters A, B, C, and D. The CPU 121 can change those set values in accordance with the contents or result of the security process or the CPU 121 can also change those set values by using the reception of the memory card command from the host apparatus as a trigger. The CPU 121 can also write those set values into the flash memory chip 130, read out the set values from the flash memory chip 130, and use them as necessary. Those set values are shown as IC card control parameters 2111 in FIG. 21. Thus, even if the MMC 110 is inactivated, those set values can be held and troublesomeness of new setting necessary each time the MMC 110 is activated can be omitted.

Figure 9:
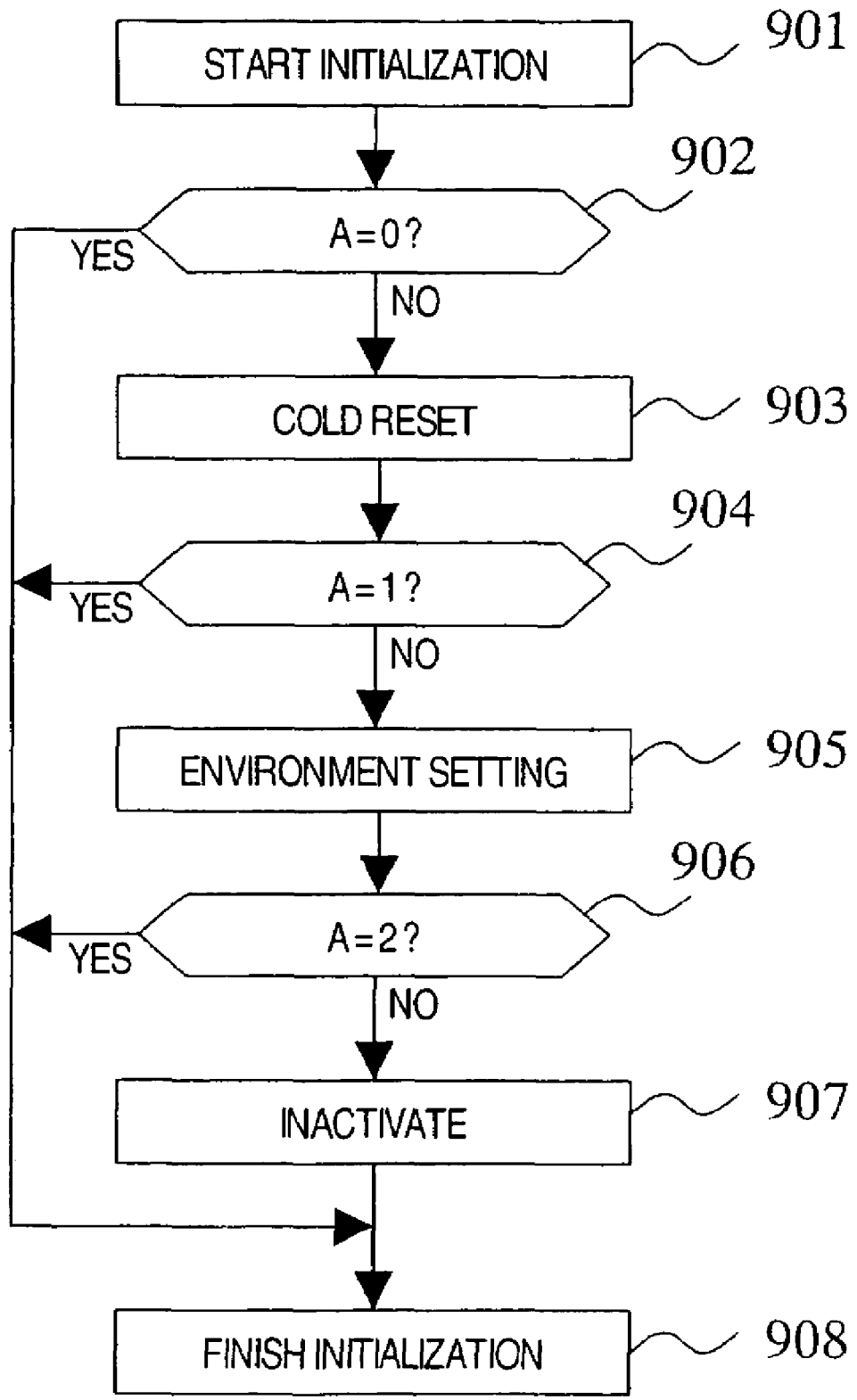
FIG. 9 is a detailed flowchart for primary IC card initialization for the IC card chip.

FIG. 9 shows a flowchart for the primary IC card initializing process. When the initializing process is started (901), first, whether the IC card control parameter A is equal to 0 or not is discriminated (902). If A=0, the initializing process is finished as it is (908). If A≠0, the IC card chip 150 is cold-reset (903). Subsequently, whether the IC card control parameter A is equal to 1 or not is discriminated (904). If A=1, the initializing process is finished (908). If A≠1, the environment setting of the IC card chip 150 is executed (905). Subsequently, whether the IC card control parameter A is equal to 2 or not is discriminated (906). If A=2, the initializing process is finished (908). If A≠2, the IC card chip 150 is inactivated (907). The initializing process is finished (908).

Figure 10:
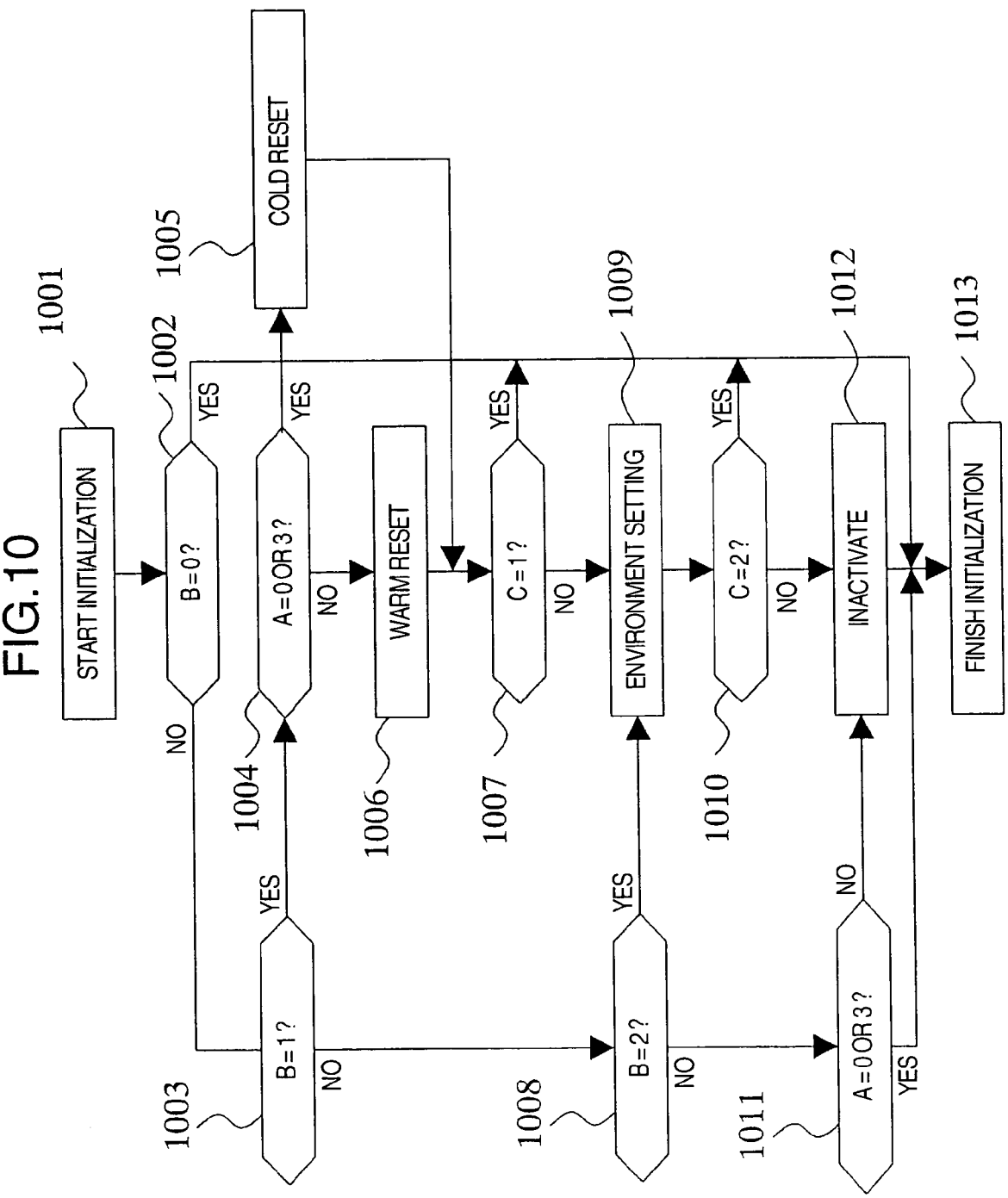
FIG. 10 is a detailed flowchart for secondary IC card initialization for the IC card chip.

FIG. 10 shows a flowchart for the secondary IC card initializing process. When the initializing process is started (1001), first, whether the IC card control parameter B is equal to 0 or not is discriminated (1002). If B=0, the initializing process is finished as it is (1013). If B≠0, whether B=1 or not is discriminated (1003). If B=1, whether the IC card control parameter A is equal to 0 or 3 or not is discriminated (1004). If A=0 or 3, the IC card chip 150 is cold-reset (1005) and step 1007 follows. If A=1 or 2, the IC card chip 150 is warm-reset (1006) and step 1007 follows. In step 1007, whether the IC card control parameter C is equal to 1 or not is discriminated. If C=1, the initializing process is finished (1013). If C≠1, step 1009 follows. If B≠1 in step 1003, whether B=2 or not is discriminated (1008). If B=2, step 1009 follows. If B≠2, whether the IC card control parameter A is equal to 0 or 3 or not is discriminated (1011). If A=0 or 3, the initializing process is finished (1013). If A=1 or 2, step 1012 follows. In step 1009, the environment setting of the IC card chip 150 is made. Whether the IC card control parameter C is equal to 2 or not is discriminated (1010). If C=2, the initializing process is finished (1013). If C≠2, step 1012 follows. In step 1012, the IC card chip 150 is inactivated. The initializing process is finished (1013).

Figure 11:
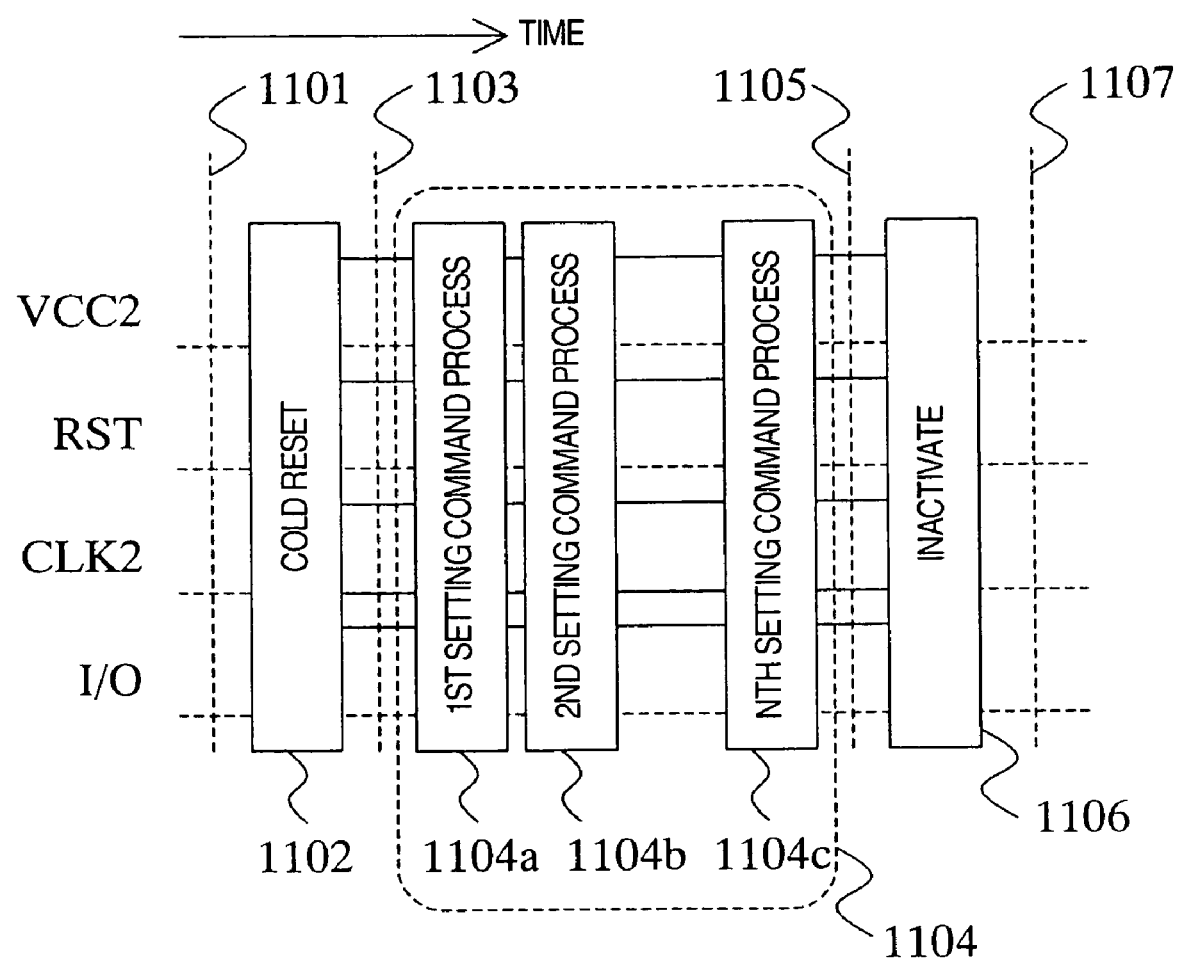
FIG. 11 is a diagram showing signal waveforms upon IC card initialization for the IC card chip in an inactive state.
Figure 12:
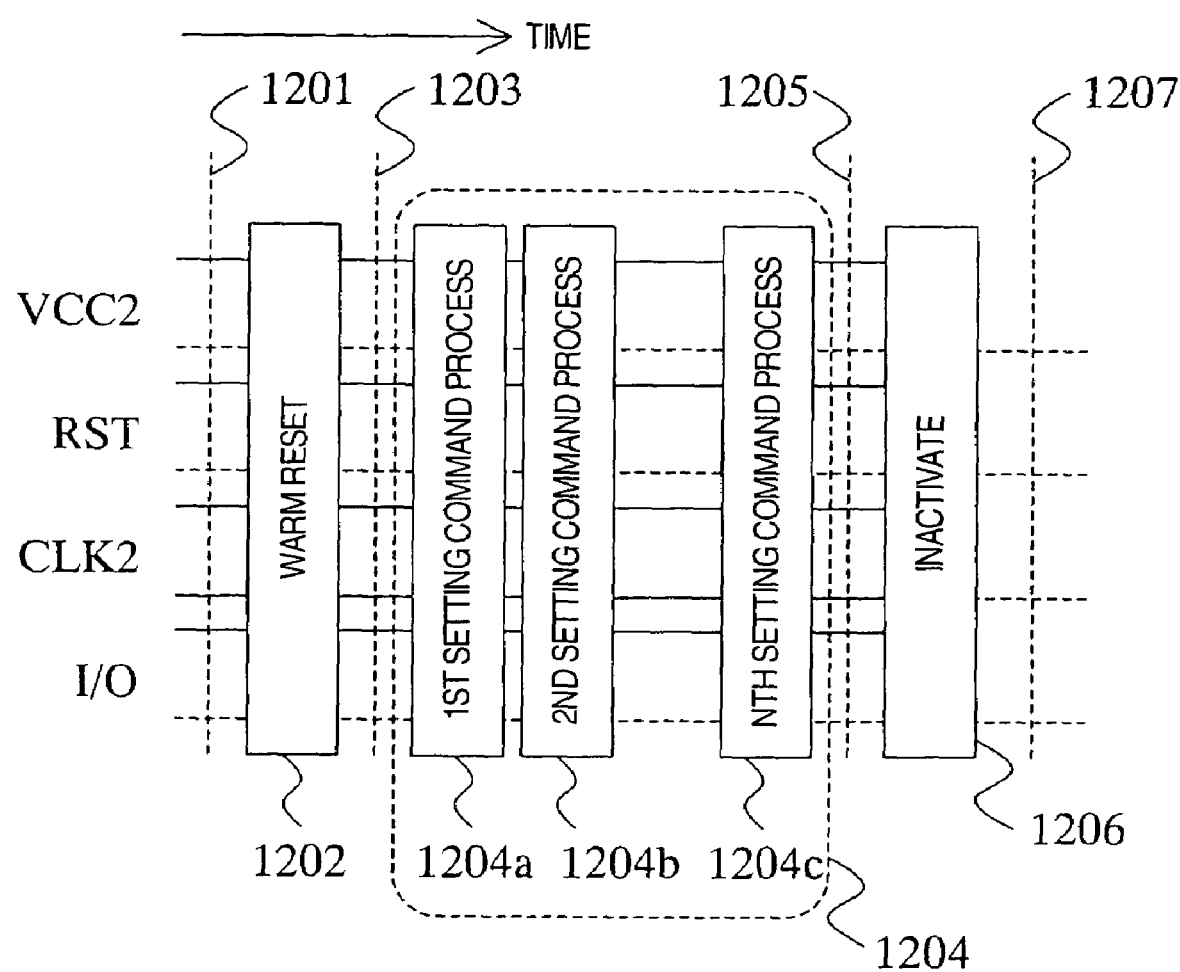
FIG. 12 is a diagram showing signal waveforms upon IC card initialization for the IC card chip in an active state.

FIG. 11 simply shows signal waveforms at the external terminals of the IC card chip 150 in the case where the primary IC card initializing process or the secondary IC card initializing process is executed when the IC card chip 150 is in the inactive state. FIG. 12 simply shows signal waveforms at the external terminals of the IC card chip 150 in the case where the secondary IC card initializing process is executed when the IC card chip 150 is in the active state. In FIGS. 11 and 12, the time is directed from left to right and the signals which are observed at the VCC2 terminal 151, RST terminal 152, CLK2 terminal 153, and I/O terminal 157 are shown from the upper row toward the lower row. A broken line in the lateral direction indicates a base (L level) of each signal. In FIG. 11, reference numeral 1102 denotes a signal waveform of the cold reset shown in FIG. 3. In FIG. 12, reference numeral 1202 denotes a signal waveform of the warm reset shown in FIG. 4. In FIGS. 11 and 12, first setting command processes 1104a and 1204a, second setting command processes 1104b and 1204b, and N-th setting command processes 1104c and 1204c indicate signal waveforms of the IC card command process shown in FIG. 5, respectively. Each of signal waveforms 1104 and 1204 of the environment setting of the IC card chip 150 is constructed by a series of signal waveforms of the N-time setting command processes. In FIGS. 11 and 12, reference numerals 1106 and 1206 denote signal waveforms of the inactivation shown in FIG. 6, respectively. In FIGS. 11 and 12, each of broken lines 1101, 1103, 1105, 1107, 1201, 1203, 1205, and 1207 in the vertical direction denotes specific time; 1101 the time before the cold reset; 1201 the time before the warm reset; 1103 the time between timing of the cold reset and timing of the environment setting; 1203 the time between timing of the warm reset and timing of the environment setting; 1105 and 1205 the time between timing of the environment setting and timing of the inactivation; and 1107 and 1207 the time after the inactivation.

The signal waveforms upon execution of the primary IC card initializing process are shown with reference to FIG. 11. When the IC card control parameter A is equal to 0, there is no change in signal waveforms. When A=1, the signal waveforms in a range from the time 1101 to the time 1103 are obtained. When A=2, the signal waveforms in a range from the time 1101 to the time 1105 are obtained. When A=3, the signal waveforms in a range from the time 1101 to the time 1107 are obtained.

The signal waveforms upon execution of the secondary IC card initializing process at the time when the IC card control parameter A is equal to 0 or 3 are shown with reference to FIG. 11. When the IC card control parameter B is equal to 0, there is no change in signal waveforms. When B=1 and the IC card control parameter C is equal to 1, the signal waveforms in a range from the time 1101 to the time 1103 are obtained. When B=1 and C=2, the signal waveforms in a range from the time 1101 to the time 1105 are obtained. When B=1 and C=3, the signal waveforms in a range from the time 1101 to the time 1107 are obtained.

The signal waveforms upon execution of the secondary IC card initializing process at the time when the IC card control parameter A is equal to 1 or 2 are shown with reference to FIG. 12. When the IC card control parameter B is equal to 0, there is no change in signal waveforms. When B=1 and the IC card control parameter C=1, the signal waveforms in a range from the time 1201 to the time 1203 are obtained. When B=1 and C=2, the signal waveforms in a range from the time 1201 to the time 1205 are obtained. When B=1 and C=3, the signal waveforms in a range from the time 1201 to the time 1207 are obtained. When B=2 and C=2, the signal waveforms in a range from the time 1203 to the time 1205 are obtained. When B=2 and C=3, the signal waveforms in a range from the time 1203 to the time 1207 are obtained. When B=3, the signal waveforms in a range from the time 1205 to the time 1207 are obtained.

Figure 13:
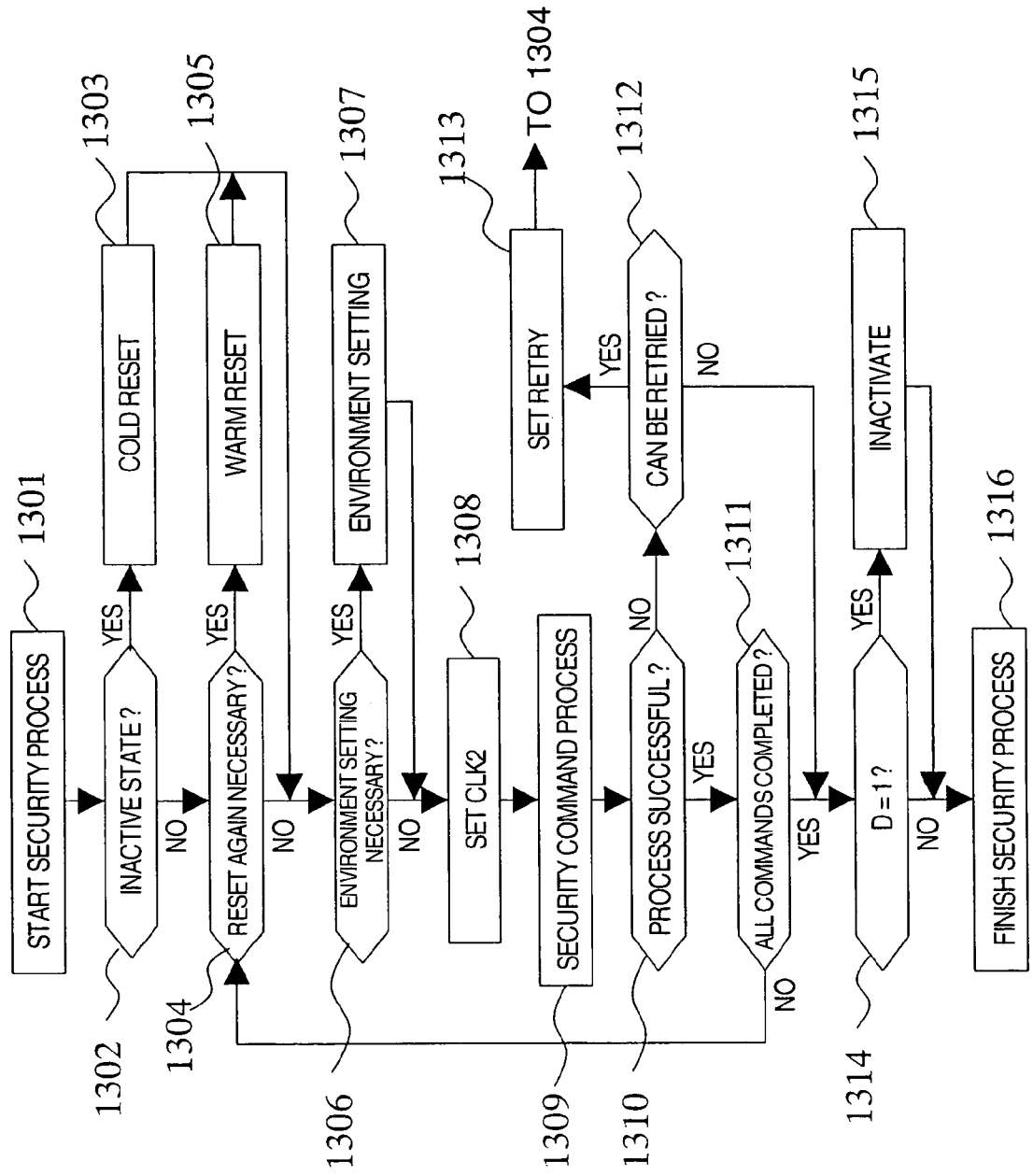
FIG. 13 is a detailed flowchart for a security process by the IC card chip.

FIG. 13 shows a flowchart at the time when the CPU 121 executes the security process requested by the host apparatus 220 by the IC card chip 150 in step 712 in FIG. 7. When the security process is started (1301), first, whether the IC card chip 150 is in the inactive state or not is discriminated (1302). If it is in the inactive state, the IC card chip 150 is cold-reset (1303) and step 1306 follows. If it is in the active state, step 1304 follows. In step 1304, whether it is necessary to reset the IC card chip 150 again before the IC card command is issued to the IC card chip 150 or not is discriminated. If it is necessary, the IC card chip 150 is warm-reset (1305) and step 1306 follows. If it is unnecessary, step 1306 follows. In step 1306, whether it is necessary to perform the environment setting of the IC card chip 150 or not is discriminated. If it is necessary, the environment setting of the IC card chip 150 is performed (1307) and step 1308 follows. If it is unnecessary, step 1308 follows. In step 1308, the frequency F2 of the clock signal which is supplied to the CLK2 terminal of the IC card chip 150 is set. The CPU 121 issues a security command to the IC card chip 150 and the IC card chip 150 processes it (1309). A processing time of the security command depends on the clock frequency F2. Subsequently, whether the process is successful or not is discriminated by the IC card response which is outputted by the IC card chip 150 (1310). If it is successful, step 1311 follows. If it fails, step 1312 follows. In step 1311, whether all security commands to be issued to the IC card chip 150 have been completed or not is discriminated. If the security commands to be issued still exist, step 1304 follows. If all security commands to be issued have been completed, step 1314 follows. In step 1312, whether the failed security command can be retried or not is discriminated. If it can be retried, retry setting is executed (1313) and step 1304 follows. The retry setting denotes that the CPU 121 prepares again the security commands to be retried and its related data. If it cannot be retried, step 1314 follows. This means that the security process required by the host apparatus 220 failed. The IC card control parameter D is checked in step 1314. If D=1, the IC card chip 150 is inactivated (1315) and the security process is finished (1316). If D≠1, the security process is finished while keeping the IC card chip 150 in the active state (1316). Although step 1308 has been located just before step 1309 so that the clock frequency F2 can be changed in accordance with the kind of security command which is issued in step 1309 in the flowchart of FIG. 13, step 1308 can be also arranged in another position.

As one of factors which validates the conventional attacking methods to the IC card, a factor such that the drive clocks of the IC card are directly supplied from an external connecting apparatus can be mentioned. Since the drive clocks are under the control of the connecting apparatus, in the timing analysis or the electric power difference analysis, the timing for the internal process of the IC card can be easily obtained in the measurement of the electric signal. In the failure use analysis, an arithmetic operation error is easily caused due to the supply of the abnormal drive clocks. According to the invention, when the security process is executed in the MMC 110 by the IC card chip 150, the host apparatus 220 cannot directly supply the drive clocks of the IC card chip 150. The CPU 121 can freely set the frequency F2 of the clocks which are supplied to the IC card chip 150. Thus, it is possible to realize the security process which flexibly corresponds to the processing performance required by the host apparatus 220. It is sufficient that if the host apparatus 220 requests the high-speed security process, the frequency F2 is set to a high value and if it requests the low electric power consumption, the frequency F2 is set to a low value or the clocks are properly stopped. The CPU 121 can freely set not only the frequency F2 but also the supply start timing and supply stop timing of the clocks. By changing them at random, the attacking method called a timing analysis, an electric power difference analysis, or a failure use analysis to the IC card chip 150 can be made difficult.

Since the timing analysis is made on the assumption that the attacker can accurately measure the processing time of cryptographic process of once, as a countermeasure against it, it is effective to disable the attacker to accurately measure the processing time. The reason why the timing analysis becomes difficult by the invention is that the host apparatus 220 cannot accurately measure the duration of the time during which the IC card chip 150 is processing the IC card command. As a countermeasure against the electric power difference analysis, it is effective to disable information regarding the execution timing or order of the processes to be detected from the outside. The reason why the electric power difference analysis becomes difficult by the invention is that it is difficult for the host apparatus 220 to detect the time when the IC card command has been issued, the contents of the issued IC card command, and the order of the issued IC card commands (in the case of executing the security process by combining a plurality of IC card commands). As a countermeasure against the failure use analysis, it is effective to use a method whereby an operation environment detecting circuit of clocks, a voltage, a temperature, and the like is installed in the IC card and if abnormality is detected, the process is stopped or disabled. The reason why the failure use analysis becomes difficult by the invention is that since the CLK2 control circuit 127 does not supply the abnormal drive clocks to the IC card chip 150, it is prevented that the host apparatus 220 makes the IC card chip 150 cause the arithmetic operation error.

The CPU 121 can change the set values of the frequency F2 of the clocks which are supplied to the IC card chip 150, the supply start timing, and the supply stop timing in accordance with the contents or the result of the security process or can change them by using the reception of the memory card command from the host apparatus as a trigger. The CPU 121 can also write those set values into the flash memory chip 130, read out those set values from the flash memory chip 130, and use them as necessary. Those set values are shown as CLK2 setting information 2113 in FIG. 21. Thus, even if the MMC 110 has been inactivated, those set values can be held and troublesomeness of new setting necessary each time the MMC 110 is activated can be omitted.

Figure 14:
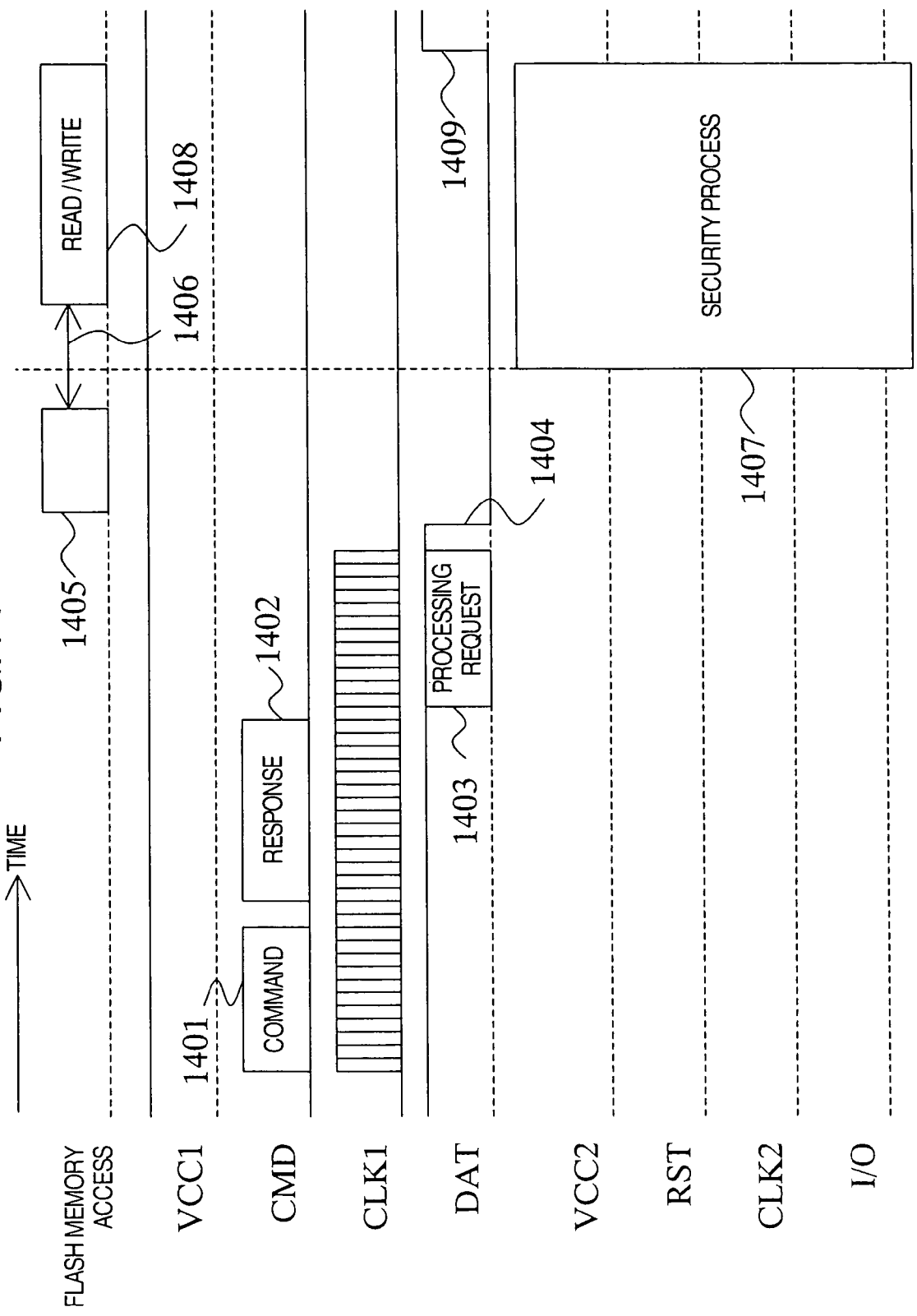
FIG. 14 is a diagram showing signal waveforms and a flash memory chip access at the time of processing a security processing request write command.

FIG. 14 simply shows signal waveforms at the external terminals of the MMC 110 and the IC card chip 150 and the access by the CPU 121 to the flash memory chip 130 in steps (steps 710 to 712 in FIG. 7) which are executed in a range from the timing when the host apparatus 220 has issued the security processing request write command to the MMC 110 to the timing when the security process is executed in the IC card chip 150. In FIG. 14, the time is directed from left to right. The top row indicates the contents of the access to the flash memory chip 130. The signals which are observed at the VCC1 terminal 144, CMD terminal 142, CLK1 terminal 145, DAT terminal 147, VCC2 terminal 151, RST terminal 152, CLK2 terminal 153, and I/O terminal 157 are shown from the second top row toward the lower row. A broken line in the lateral direction indicates the base (L level) of each signal. A procedure in a range from the timing when the host apparatus 220 has issued the security processing request write command to the MMC 110 to the timing when the security process is executed in the IC card chip 150 will be described with reference to FIG. 14. First, the host apparatus 220 transmits the security processing request write command to the CMD terminal 142 (1401). Subsequently, the host apparatus 220 receives a response to the security processing request write command from the CMD terminal 142 (1402). This response notifies the host apparatus 220 that the MMC 110 has received the command and is not the execution result of the security process. Subsequently, the host apparatus 220 transmits the security processing request to the DAT terminal 147 (1403). The security processing request is host data including the contents of the security process and the data to be processed. Subsequently, the MMC 110 sets the DAT terminal 147 to the L level (1404). By this setting, the MMC 110 notifies the host apparatus 220 that it is in a busy state. Subsequently, the CPU 121 issues the command for writing the security processing request received from the host apparatus 220 into the flash memory chip 130 (1405). By writing the security processing request into the flash memory chip 130, a consumption amount of a work memory in the CPU 121 can be saved in the process (step 711 in FIG. 7) in which the CPU 121 describes the security processing request in the IC card command format. Such a method is effective when a data size of the security processing request is large. The security processing request written in the flash memory chip 130 is stored into the security process buffer area 2114 in FIG. 21. Write command issuance 1405 is not the indispensable operation. A write processing period 1406 denotes a period of time during which the flash memory chip 130 is executing the writing process of the security processing request. A security process 1407 shows signal waveforms of the security process by the IC card chip 150. Those signal waveforms depend on transition steps in the flowchart of FIG. 13. The security process 1407 can be overlapped to the write processing period 1406. Generally, since the write processing period 1406 of the flash memory chip 130 is on the order of millisecond, the method of overlapping the write processing period 1406 to the security process 1407 is effective in reduction of the whole processing time of the security process. Read/write 1408 denotes an access such that the security processing request is read out from the flash memory chip 130 or the calculation result outputted by the IC card chip 150 is written into the flash memory chip 130 during the execution of the security process 1407. The consumption amount of the work memory in the CPU 121 can be saved by the access. Such a method is effective when the data size of the security processing request or the security processing result is large. The read/write 1408 is not indispensable. After completion of the security process 1407, the MMC 110 sets the DAT terminal 147 to the H level (1409). By this setting, the MMC 110 notifies the host apparatus 220 that the security process has been completed.

Figure 15:
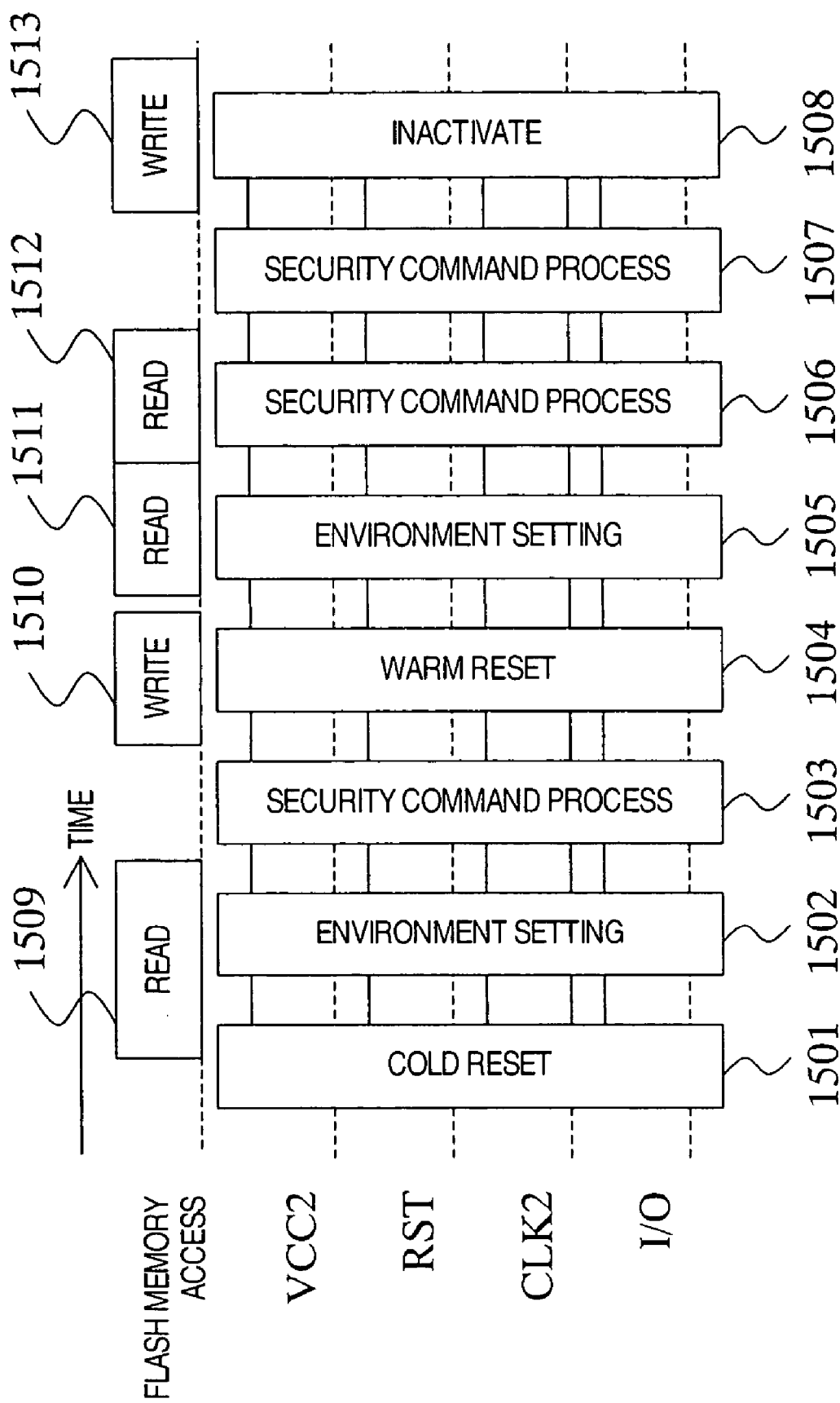
FIG. 15 is a diagram showing an example of signal waveforms and a flash memory chip access at the time of executing the security process by the IC card chip.

FIG. 15 shows an example of signal waveforms of the security process 1407 in FIG. 14. In FIG. 15, the time is directed from left to right. The top row indicates the contents of the access to the flash memory chip 130. The signals which are observed at the VCC2 terminal 151, RST terminal 152, CLK2 terminal 153, and I/O terminal 157 are shown from the second top row toward the lower row. A broken line in the lateral direction indicates the reference (L level) of each signal. Reference numeral 1501 denotes signal waveforms of the cold reset shown in FIG. 3; 1504 signal waveforms of the warm reset shown in FIG. 4; 1502 and 1505 signal waveforms of the environment settings shown in FIG. 11 (or FIG. 12); 1503, 1506, and 1507 signal waveforms of the IC card command process shown in FIG. 5; and 1508 a signal waveform of the inactivation shown in FIG. 6. The signal waveforms shown in FIG. 15 are observed at the external terminals of the IC card chip 150 when the flowchart of FIG. 13 advances in order of 1301, 1302, 1303, 1306, 1307, 1308, 1309, 1310, 1311, 1304, 1305, 1306, 1307, 1308, 1309, 1310, 1311, 1304, 1306, 1308, 1309, 1310, 1311, 1314, 1315, and 1316. The access (read/write 1408) to the flash memory chip 130 by the CPU 121 during the execution of the security process 1407 in FIG. 14 will be described with reference to FIG. 15. For this access, the security process buffer area 2114 in FIG. 21 is used. Reads 1509, 1511, and 1512 denote accesses for reading the data necessary for constructing the IC card command which is transmitted to the IC card chip 150 in the security command processes 1503, 1506, and 1507 from the flash memory chip 130, respectively. Write 1510 denotes an access for writing the calculation result outputted by the IC card chip 150 in the security command process 1503 into the flash memory chip 130. Write 1513 denotes an access for writing in the lump the calculation results outputted from the IC card chip 150 in the security command processes 1506 and 1507 into the flash memory chip 130. The reads 1509, 1511, and 1512 can be overlapped to the accesses to the IC card-chip 150 before the security command processes 1503, 1506, and 1507, respectively. The writes 1510 and 1513 can be overlapped to the accesses to the IC card chip 150 after the security command processes 1503 and 1507, respectively. Those overlapping processes are effective for shortening the whole processing time of the security process. Further, when a writing unit of the flash memory chip 130 is large, a plurality of calculation results can be written in the lump as shown in the write 1513. It is effective for reducing the number of times of writing into the flash memory chip 130 and delaying deterioration of the flash memory chip 130. The contents which are written into the flash memory chip 130 in the writes 1510 and 1513 are not limited to the calculation results themselves outputted from the IC card chip 150 but can be the security processing result which is returned to the host apparatus 220 in step 715 in FIG. 7 or a part of the security processing result. In this case, step 714 in FIG. 7 or a part thereof is executed in step 712.

Figure 16:
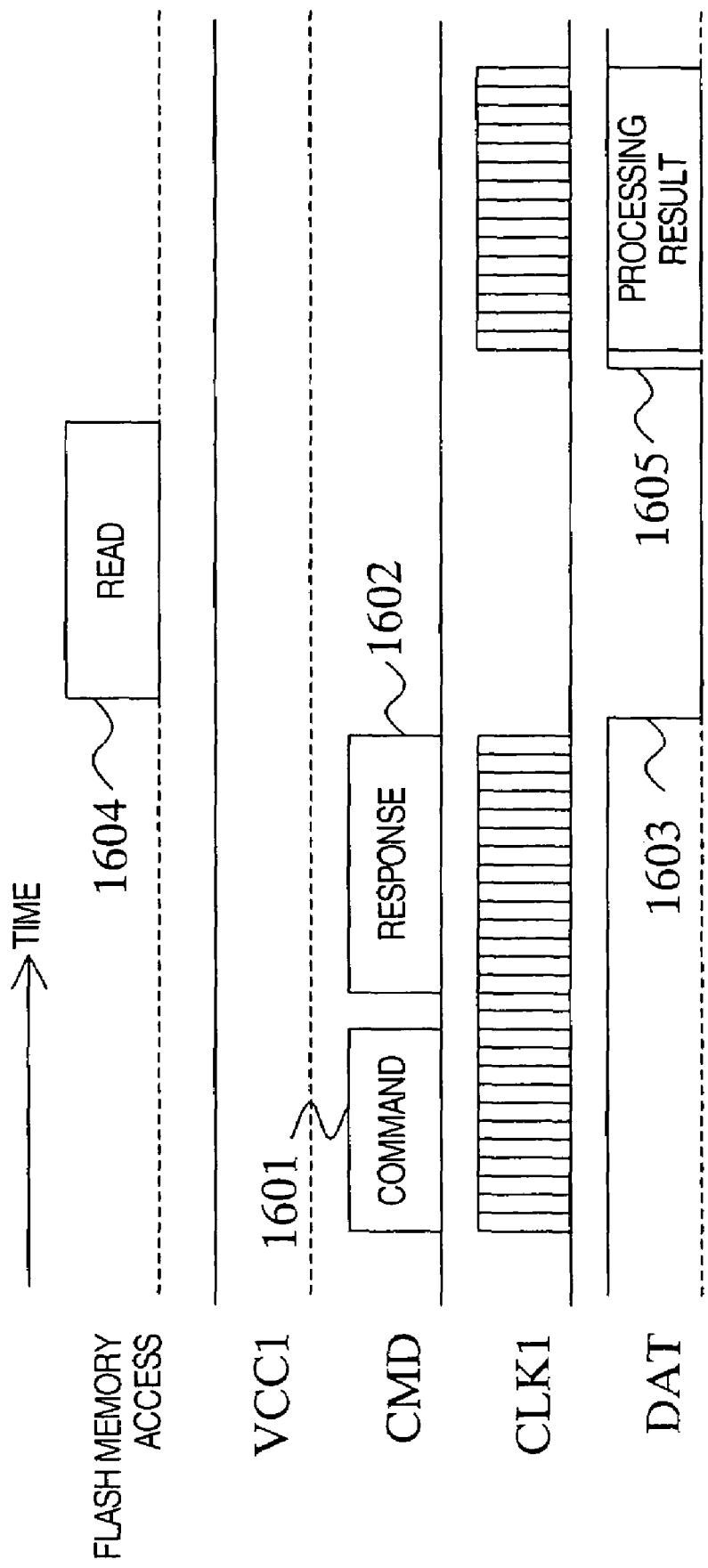
FIG. 16 is a diagram showing signal waveforms and a flash memory chip access at the time of processing a security processing result read command.

FIG. 16 simply shows signal waveforms at the external terminals of the MMC 110 and the access to the flash memory chip 130 by the CPU 121 in a procedure (steps 713 to 715 in FIG. 7) in a range from the timing when the host apparatus 220 has issued the security processing result read command to the MMC 110 to the timing when the MMC 110 outputs the security processing result. In FIG. 16, the time is directed from left to right. The top row indicates the contents of the access to the flash memory chip 130. The signals which are observed at the VCC1 terminal 144, CMD terminal 142, CLK1 terminal 145, and DAT terminal 147 are shown from the second top row toward the lower row. A broken line in the lateral direction indicates the base (L level) of each signal. A procedure in a range from the timing when the host apparatus 220 has issued the security processing result read command to the MMC 110 to the timing when the MMC 110 outputs the security processing result will be described with reference to FIG. 16. First, the host apparatus 220 transmits the security processing result read command to the CMD terminal 142 (1601). Subsequently, the host apparatus 220 receives a response to the security processing result read command from the CMD terminal 142 (1602). This response notifies the host apparatus 220 that the MMC 110 has received the command and is not the security processing result. Subsequently, the MMC 110 sets the DAT terminal 147 to the L level (1603). By this setting, the MMC 110 notifies the host apparatus 220 that it is in a busy state. Subsequently, the CPU 121 reads out the calculation result outputted by the IC card chip 150 from the security process buffer area (2114 in FIG. 21) in the flash memory chip 130 (1604). The CPU 121 constructs a security processing result on the basis of it and the MMC 110 outputs the security processing result to the DAT terminal 147

(1605). If step 714 in FIG. 7 or a part thereof is executed in step 712, the security processing result or a part thereof is read out from the security process buffer area (2114 in FIG. 21) in the flash memory chip 130 in step 1604. Step 1604 is unnecessary in the case of constructing the security processing result without using the security process buffer area (2114 in FIG. 21) in the flash memory chip 130.

FIG. 27 shows an example of a format of each of the security processing request data which is transmitted to the MMC 110 in step 710 in FIG. 7 and the security processing result data which is received by the host apparatus 220 in step 715. It is preferable to apply such a format in the case where the contents of the requested security process can be expressed by one IC card command and the result of the security process can be expressed by one IC card response. Both of the IC card command which is transmitted to the IC card chip 150 and the IC card response which is received from the IC card chip 150 comply with the ISO/IEC 7816-4 standard. According to this standard, in the construction of the IC card command, a header of 4 bytes (a class byte CLA, an instruction byte INS, and parameter bytes P1 and P2) are indispensable, and an input data length indication byte Lc, input data Data In, and an output data length indication byte Le follow as necessary. In the construction of the IC card response, statuses SW1 and SW2 of 2 bytes are indispensable and output data Data Out is arranged before them as necessary. In data 2701 of the security processing request in the above format, a format identifier FID 2703 and an IC card command length Lca 2704 are added before an IC card command 2702 and, further, dummy data 2705 is padded after the IC card command 2702. The FID 2703 includes an identification number of the format or attribute data of the format. A value of the Lca 2704 is equal to a value obtained by summing the lengths of the component elements of the IC card command 2702. In data 2711 of the security processing result, a format identifier FID 2713 and an IC card response length Lra 2714 are added before an IC card response 2712 and, further, dummy data 2715 is padded after the IC card response 2712. The FID 2713 includes an identification number of the format or attribute data of the format. A value of the Lra 2714 is equal to a value obtained by summing the lengths of the component elements of the IC card response 2712. In the diagram, the example of the format in the case where Lc, Data In, and Le are included in the IC card command and Data Out is included in the IC card response is shown. In the Multi Media Card specifications, it is a standard manner that the data to be read/write-accessed is processed on a block unit basis of a fixed length. Therefore, it is preferable that the sizes of the data 2701 of the security processing request and the data 2711 of the security processing result are also set to be identical to the block size complying with the Multi Media Card specifications. The dummy data 2705 and 2715 are applied to make the sizes of the data 2701 of the security processing request and the data 2711 of the security processing result coincide with the block size. It is desirable that the value which is used as a block size is set to a sector size (512 bytes) in the FAT system which is used for the logical file system in a general small memory card. As dummy data 2705 and 2715 to be padded, the data of all zero or random numbers can be used. A check sum which is used by the CPU 121 or the host apparatus 220 in order to detect and correct a data error can be also used. The value of the Lca 2704 is used in order to remove the dummy data 2705 from the data 2701 of the security processing request by the CPU 121. The value of the Lra 2714 is used in order to remove the dummy data 2715 from the data 2711 of the security processing result by the host apparatus 220.

Before the MMC 110 is provided for the user of the security system or when a problem occurs in the MMC 110 which the user possesses, the manufacturer or the administrator of the MMC 110 needs to write various initial data into the IC card chip 150 built in the MMC 110 or test the IC card chip 150. To improve the usability of those operations which are executed by the manufacturer or the administrator of the MMC 110, the MMC 110 has an interface function for allocating the external terminals of the IC card chip 150 to the MMC external terminals 140. Thus, the access signals to the IC card chip 150 as shown in FIGS. 3 to 6 can be directly transmitted and received to/from the MMC external terminals 140. Such an operating mode of the MMC 110 is hereinlater called an interface direct mode in order to distinguish from the operating mode complying with the Multi Media Card specifications.

Figure 17:
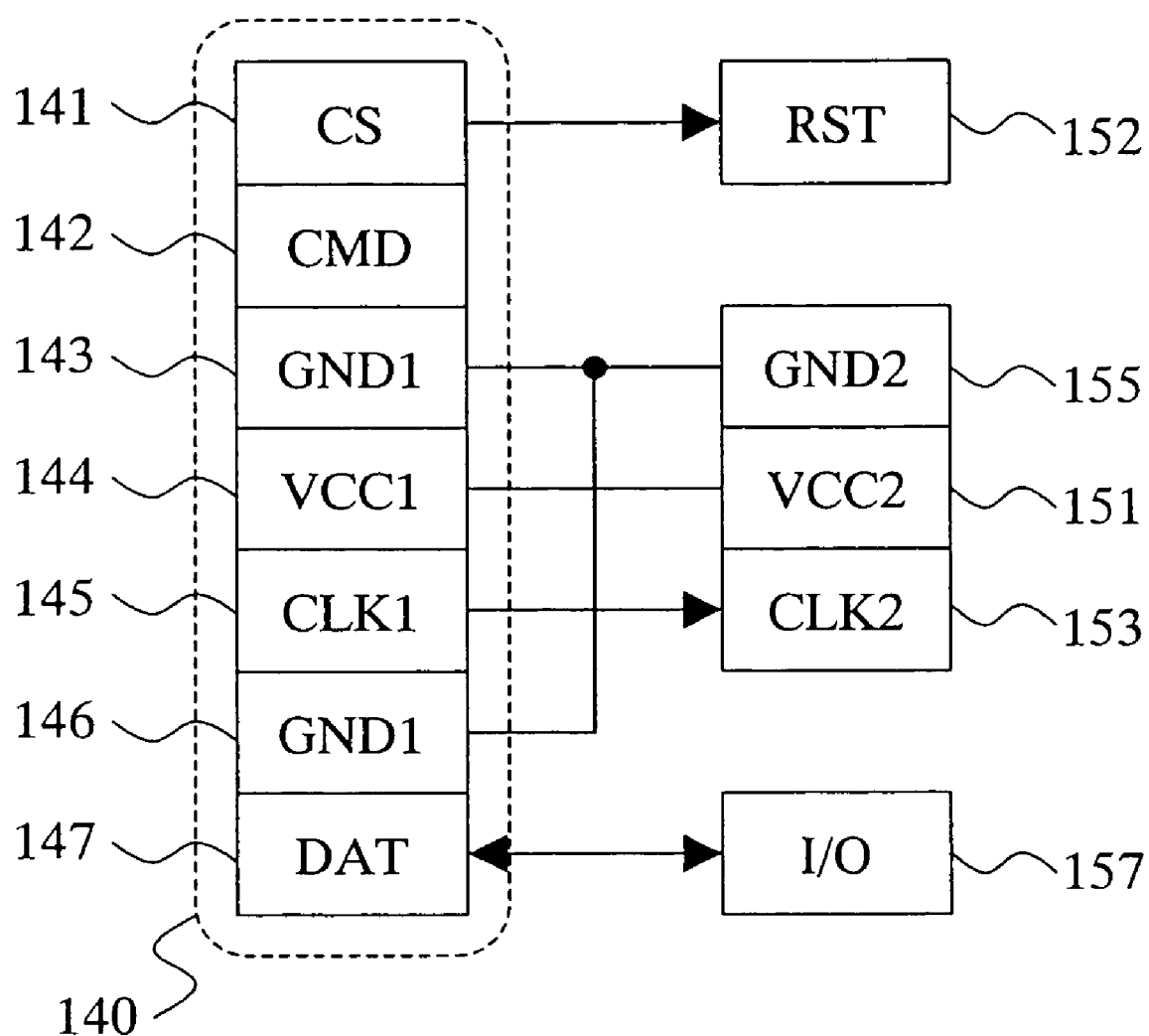
FIG. 17 is a diagram showing a correspondence relation between an MMC external terminal and an IC card chip external terminal in an interface direct mode.

The interface direct mode will be described in detail. FIG. 17 shows an example of a correspondence relation at the time of allocating the external terminals of the IC card chip 150 to the MMC external terminals 140. In this example, the RST terminal 152 is allocated to the CS terminal 141, the GND2 terminal 155 is allocated to the GND1 terminals 143 and 146, the VCC2 terminal 151 is allocated to the VCC1 terminal 144, the CLK2 terminal 153 is allocated to the CLK1 terminal 145, and the I/O terminal 157 is allocated to the DAT terminal 147, respectively. At this time, the CS terminal 141 and the CLK1 terminal 145 function as input terminals and the DAT terminal 147 functions as an input/output terminal.

When the MMC 110 receives the specific memory card command, it can shift the operating mode to the interface direct mode or return it from the interface direct mode to the operating mode complying with the Multi Media Card specifications. The memory card command to shift the operating mode to the interface direct mode is called a direct command and the memory card command to return the operating mode from the interface direct mode to the normal mode is called a return command hereinbelow. Referring to FIG. 1, the MMC I/F control circuit 123 is connected to the VCC2 control circuit 126, the CLK2 control circuit 127, and the IC card I/F control circuit 128. When the MMC 110 receives the direct command from the host apparatus 220, it executes the terminal allocation shown in FIG. 17 by an instruction of the CPU 121. When the MMC 110 receives the return command from the host apparatus 220, it cancels the terminal allocation shown in FIG. 17 by an instruction of the CPU 121. The MMC 110 is returned to the operating mode complying with the Multi Media Card specifications.

Since the host apparatus 220 can directly access the IC card chip 150 in the interface direct mode, it is necessary to designate the persons who can use the interface direct mode to only the limited persons in view of the security. Therefore, when the direct command is issued, it is necessary to transmit a password which is not known to the general users. Unless the correct password is inputted, the interface direct mode cannot be used.

Figure 18:
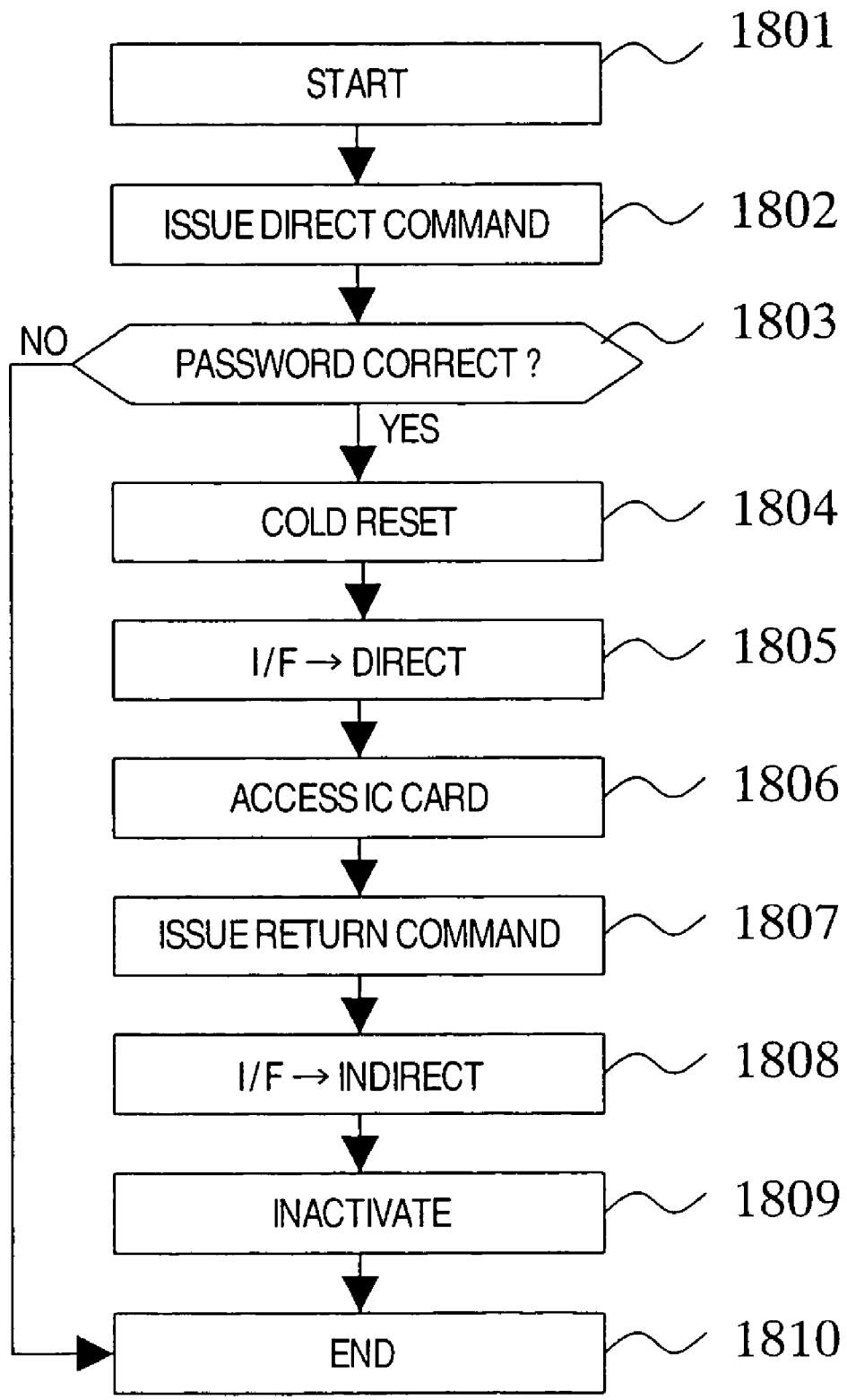
FIG. 18 is a flowchart for a process for shifting to the interface direct mode and a process for returning from the interface direct mode.

FIG. 18 shows a flowchart for processes in a range from the timing when the host apparatus 220 shifts the operating mode of the MMC 110 from the operating mode complying with the Multi Media Card specifications to the interface direct mode and directly accesses the IC card chip 150 to the timing when the host apparatus 220 thereafter again returns the operating mode of the MMC 110 to the operating mode complying with the Multi Media Card specifications. The host apparatus 220 starts the process (1801) and, first, issues the direct command to the MMC 110 (1802). The MMC 110 discriminates whether the password transmitted by the direct command is correct or not (1803). If it is correct, step 1804 follows. If it is wrong, the processing routine is finished (1810). In step 1804, the CPU 121 cold-resets the IC card chip 150. The terminal allocation shown in FIG. 17 is executed and the interface is set to the direct mode (1805). The host apparatus 220 directly accesses the IC card chip 150 from this point of time (1806). When the host apparatus 220 finishes the direct access to the IC card chip 150 and again returns the operating mode of the MMC 110 to the operating mode complying with the Multi Media Card specifications, the host apparatus 220 issues the return command to the MMC 110 (1807). Thus, the CPU 121 cancels the terminal allocation shown in FIG. 17 and the MMC 110 is returned to the operating mode complying with the Multi Media Card specifications (1808). The CPU 121 inactivates the IC card chip 150 (1809). The processes are finished in this manner (1810).

Figure 19:
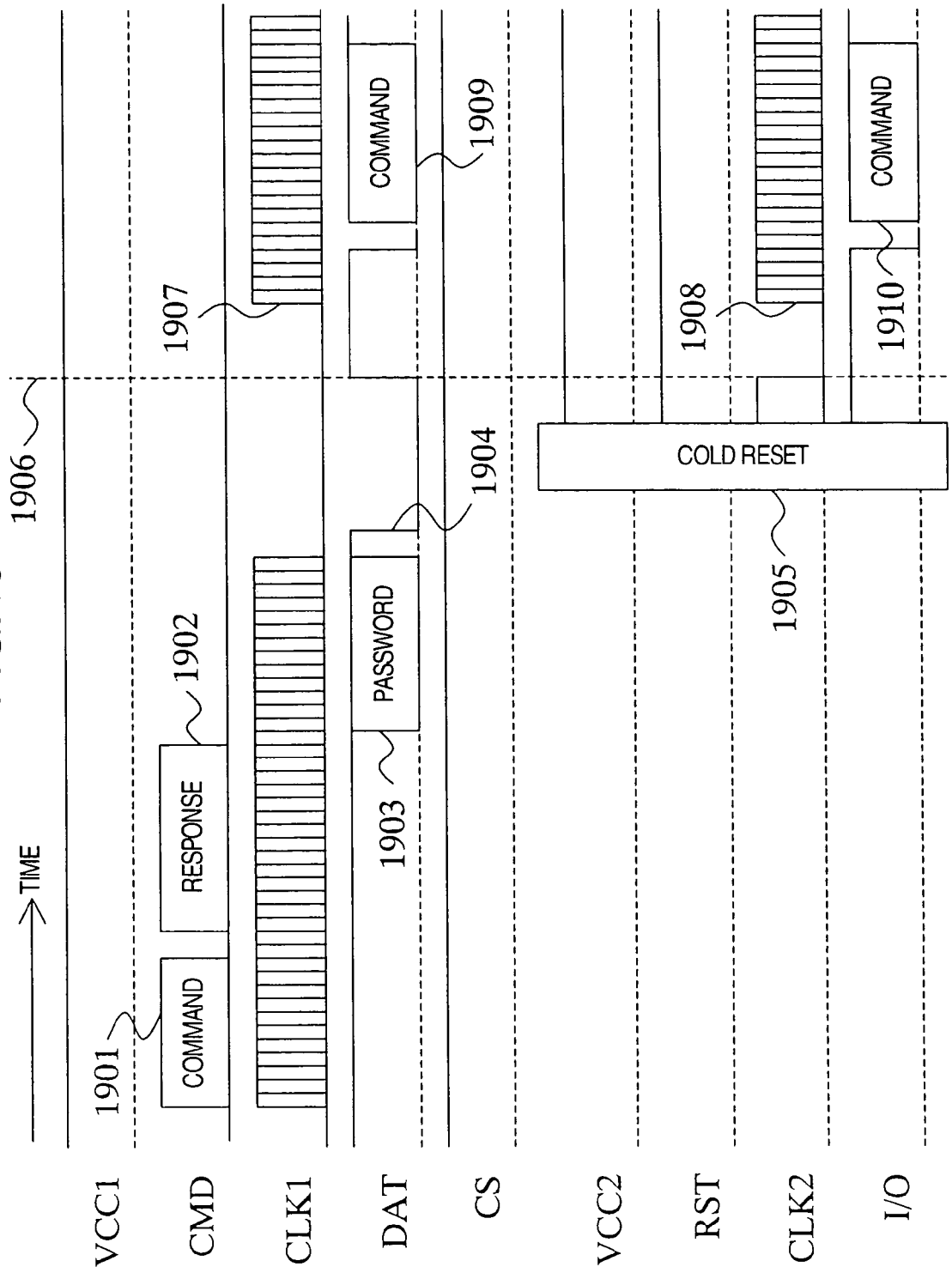
FIG. 19 is a diagram showing signal waveforms at the time of the process for shifting to the interface direct mode.

FIG. 19 simply shows signal waveforms at the external terminals of the MMC 110 and the IC card chip 150 in the procedure in steps 1801 to 1806 in FIG. 18. In FIG. 19, the time is directed from left to right. The signals which are observed at the VCC1 terminal 144, CMD terminal 142, CLK1 terminal 145, DAT terminal 147, VCC2 terminal 151, RST terminal 152, CLK2 terminal 153, and I/O terminal 157 are shown from the upper row toward the lower row. A broken line in the lateral direction indicates the reference (L level) of each signal. Reference numeral 1905 denotes signal waveforms of the cold reset in FIG. 3. Mode shift time 1906 indicates time when the operating mode is shifted to the interface direct mode.

A procedure in which the host apparatus 220 shifts the operating mode of the MMC 110 from the operating mode complying with the Multi Media Card specifications to the interface direct mode and directly accesses the IC card chip 150 will now be described with reference to FIG. 19. 3V (standard voltage at the VCC2 terminal 151) has been supplied to the VCC1 terminal 144 of the MMC 110. When the host apparatus 220 inputs the direct command to the CMD terminal 142 (1901), a response to the direct command is outputted from the CMD terminal 142 (1902). This response notifies the host apparatus 220 that the MMC 110 has received the command. Subsequently, the host apparatus 220 inputs a password to the DAT terminal 147 (1903). After the input of the password, the MMC 110 outputs an L-level signal to the DAT terminal 147 (1904) and notifies the host apparatus 220 that it is in a busy state. The CPU 121 cold-resets the IC card chip 150 during the busy state (1905). At the mode shift time 1906, the operating mode is shifted to the interface direct mode. At this time, the DAT terminal 147 is changed from the L level to the high impedance state. Thus, the host apparatus 220 can know the cancellation of the busy state. From this point of time, the host apparatus 220 directly accesses the IC card chip 150. For example, when the clock is supplied to the CLK1 terminal 145 (1907), the clock is supplied to the CLK2 terminal 153 (1908). When the IC card command is transmitted to the DAT terminal 147 (1909), the IC card command is transmitted to the I/O terminal 157 (1910).

Figure 20:
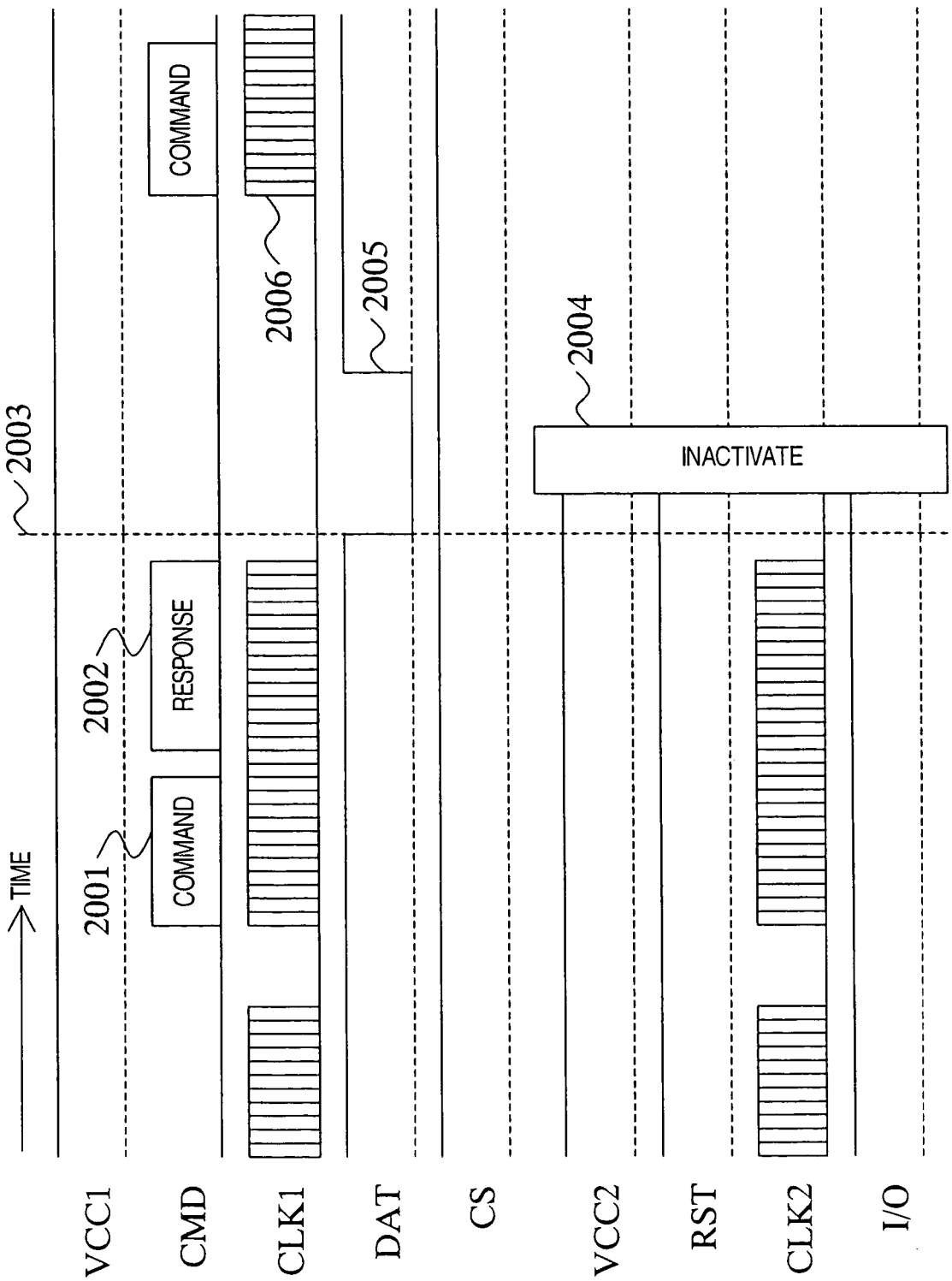
FIG. 20 is a diagram showing signal waveforms at the time of the process for returning from the interface direct mode.

FIG. 20 simply shows signal waveforms at the external terminals of the MMC 110 and the IC card chip 150 in a procedure in steps 1807 to 1810 in FIG. 18. In FIG. 20, the time is directed from left to right. The signals which are observed at the VCC1 terminal 144, CMD terminal 142, CLK1 terminal 145, DAT terminal 147, VCC2 terminal 151, RST terminal 152, CLK2 terminal 153, and I/O terminal 157 are shown from the upper row toward the lower row. A broken line in the lateral direction indicates the base (L level) of each signal. Mode return time 2003 denotes time when the operating mode is returned from the interface direct mode to the operating mode complying with the Multi Media Card specifications. Reference numeral 2004 denotes signal waveforms of the inactivation in FIG. 6.

Referring to FIG. 20, the procedure by which the host apparatus 220 returns the operating mode of the MMC 110 from the interface direct mode to the operating mode complying with the Multi Media Card specifications will be described. 3V (standard voltage at the VCC2 terminal 151) has been supplied to the VCC1 terminal 144 of the MMC 110. When the host apparatus 220 inputs the return command to the CMD terminal 142 (2001), a response to the return command is outputted from the CMD terminal 142 (2002). This response notifies the host apparatus 220 that the MMC 110 has received the command. The MMC 110 outputs an L-level signal to the DAT terminal 147 at the mode return time 2003, notifies the host apparatus 220 that it is in a busy state, and at the same time, returns the operating mode to the operating mode complying with the Multi Media Card specifications. During the busy state, the CPU 121 inactivates the IC card chip 150 (2004). The MMC 110 sets the DAT terminal 147 into the high-impedance state (2005) and notifies the host apparatus 220 that the process of the return command has been completed. After that, the host apparatus 220 cannot directly access the IC card chip 150. If the host apparatus 220 transmitted some memory card command to the CMD terminal 142 while supplying the clocks to the CLK1 terminal 145, the clock signal (2006) is not transferred to the IC card chip 150. Although the clock signal which is supplied to the CLK1 terminal 145 by the host apparatus 220 in 2001 or 2002 is also transferred to the CLK2 terminal 153 of the IC card chip 150, since the DAT terminal 147 is in the high-impedance state, the IC card chip 150 does not erroneously recognize the IC card command.

In FIG. 21, information showing a progressive situation of the security process by the IC card chip 150 is stored in the security process state area 2116. The CPU 121 can update this information during the execution of the security process. For example, if the power supply to the MMC 110 is stopped on the way of the security process, the CPU 121 reads out such information and refers to it at the restart of the power supply, so that the security process can be restarted from the stage where it has been interrupted.

According to the embodiment of the invention, since the drive clocks of the IC chip are not directly supplied from the outside of the memory card, the processing time of the IC chip cannot be accurately measured and it is difficult to detect the execution timing and order of the processes. Further, the abnormal drive clocks cannot be supplied and it is difficult to cause the arithmetic operation error. Therefore, the security for the attacking method such as timing analysis, electric power difference analysis, or failure use analysis is improved.

According to the embodiment of the invention, the control method of the IC chip can be freely set from the outside of the memory card. For example, if the high-speed process is required, the control method in which the frequency of the drive clocks of the IC chip is high can be set. If the low electric power consumption is required, the control method in which the frequency of the drive clocks of the IC chip are low or the drive clocks of the IC chip is properly stopped can be set. Therefore, the security process flexibly corresponding to the processing performance which is required by the security system can be realized.

According to the invention, the data necessary for the security process by the IC chip and the information for managing the IC chip can be held in the flash memory. Thus, usability of the security process can be improved.

According to the embodiment of the invention, the manufacturer or the administrator of the MMC can directly access the IC chip in the MMC. Therefore, the initialization and maintenance of the IC chip in the MMC can be realized by a method similar to that of the conventional IC card.

According to the embodiment of the invention, in the case of adding the security function to the MMC having the flash memory chip, by additionally installing the IC card chip which has previously been authenticated by the Security Authentication Facilities, the authentication by the Security Authentication Facilities is unnecessary, so that the developing period of time or the manufacturing period of time of the MMC is shortened.

INDUSTRIAL APPLICABILITY

According to the invention, an effect such that the security of the storage apparatus is improved is obtained.

According to the invention, an effect such that the manufacturing of the storage apparatus is simplified is obtained.

Although the above disclosure has been made with respect to the embodiment, it will be obvious to those with ordinary skill in the art that many variations and modifications are possible within the purview of the spirit and claims of the present invention.

The invention claimed is:

1. A memory device connectable with a host apparatus and adapted to operate with power and clocks supplied from the host apparatus, comprising:
    external terminals for connecting with the host apparatus;
    a flash memory chip adapted to store data;
    an IC chip adapted to process data; and
    a controller chip connected with the external terminals, the flash memory chip and the IC chip, wherein:
    the flash memory chip, the IC chip and the controller chip are discrete chips,
    responsive to a command from the host apparatus, the controller chip writes data inputted from the host apparatus into the flash memory chip via the external terminals, and, responsive to a command from the host apparatus, the controller chip transfers data read from the flash memory chip to the host apparatus via the external terminals,
    responsive to a command from the host apparatus, the controller chip transfers data inputted from the host apparatus to the IC chip via the external terminals, and responsive to a command from the host apparatus, the controller chip transfers data inputted from the IC chip to the host apparatus via the external terminals, and
    a power terminal, a clock terminal and a data terminal of the external terminals are connected with the controller chip and a clock terminal of the IC chip is connected with the controller chip.

2. The memory device according to claim 1, wherein:
    a power terminal and a data terminal of the IC chip are connected with the controller chip, and
    a ground terminal of the IC chip is connected with a ground terminal of the external terminals.

3. The memory device according to claim 1, wherein:
    the IC chip includes a CPU, a ROM, a RAM and an EEPROM, and
    the controller chip includes a CPU, a first interface control circuit for the external terminals, a second interface control circuit for the flash memory chip, a third interface control circuit for the IC chip and an oscillator adapted to generate clocks to be output to the clock terminal of the IC chip.

4. The memory device according to claim 1, wherein the controller chip outputs, to the clock terminal of the IC chip, clocks independent of clocks inputted from the host apparatus via the external terminals.

5. The memory device according to claim 4, wherein:
    the controller chip includes an oscillator which generates clocks and a control circuit which controls the clocks generated by the oscillator independently of the clocks inputted from the host apparatus, and
    the controller chip outputs the clocks controlled by the control circuit to the clock terminal of the IC chip.

6. The memory device according to claim 1, wherein:
    the controller chip is adapted to analyze a command inputted from the host apparatus via the external terminals, and adapted to determine whether to access the flash memory chip or the IC chip according to a type of the inputted command.

7. A memory device connectable with a host apparatus and adapted to operate with power and clocks supplied from the host apparatus, comprising:
    external terminals for connecting with the host apparatus;
    a flash memory chip adapted to store data;
    an IC chip adapted to process data; and
    a controller chip connected with the external terminals, the flash memory chip and the IC chip, wherein:
    the flash memory chip, the IC chip and the controller chip are discrete chips,
    responsive to a command from the host apparatus, the controller chip writes data inputted from the host apparatus into the flash memory chip via the external terminals, and, responsive to a command from the host apparatus, the controller chip transfers data read from the flash memory chip to the host apparatus via the external terminals,
    responsive to a command from the host apparatus, the controller chip transfers data inputted from the host apparatus to the IC chip via the external terminals, and responsive to a command from the host apparatus, the controller chip transfers data inputted from the IC chip to the host apparatus via the external terminals,
    a power terminal, a clock terminal and a data terminal of the external terminals are connected with the controller chip, and
    a power terminal of the IC chip is connected with the controller chip.

8. The memory device according to claim 7, wherein:
    a data terminal of the IC chip is connected with the controller chip, and
    a ground terminal of the IC chip is connected with a ground terminal of the external terminals.

9. The memory device according to claim 7, wherein:
    the IC chip includes a CPU, a ROM, a RAM and an EEPROM, and
    the controller chip includes a CPU, a first interface control circuit for the external terminals, a second interface control circuit for the flash memory chip, a third interface control circuit for the IC chip and a power generating circuit which supplies power to the power terminal of the IC chip.

10. The memory device according to claim 7, wherein the controller chip is adapted to analyze a command inputted from the host apparatus via the external terminals, and is adapted to determine whether to access the flash memory chip or the IC chip according to a type of the inputted command.

11. A memory device connectable with a host apparatus, comprising:
   external terminals for connecting with the host apparatus;
   a flash memory chip adapted to store data;
   an IC chip adapted to process data; and
   a controller chip connected with the external terminals, the flash memory chip and the IC chip, wherein:
      the external terminals include a command terminal, first and second ground terminals, a power terminal, a clock terminal and a data terminal,
      the flash memory chip includes a power terminal, a ground terminal, a data terminal, a ready/busy terminal, a chip enable terminal, an output enable terminal, a write enable terminal, a clock terminal and a reset terminal,
      the IC chip includes a power terminal, a reset terminal, a clock terminal, a ground terminal and a data terminal,
      the command terminal, the first and second ground terminals, the power terminal, the clock terminal and the data terminal of the external terminals are connected with the controller chip,
      the data terminal, the ready/busy terminal, the chip enable terminal, the output enable terminal, the write enable terminal, the clock terminal and the reset terminal of the flash memory chip are connected with the controller chip, and
      the reset terminal, the clock terminal and the data terminal of the IC chip are connected with the controller chip.

12. The memory device according to claim 11, wherein:
   the power terminal of the flash memory chip is connected with the power terminal of the external terminals,
   the ground terminal of the flash memory chip is connected with the first and second ground terminals of the external terminals,
   the power terminal of the IC chip is connected with the controller chip, and
   the ground terminal of the IC chip is connected with the first and second ground terminals of the external terminals.

13. The memory device according to claim 11, wherein the IC chip includes a CPU, a ROM, a RAM and an EEPROM, and
   the controller chip includes a CPU, a first interface control circuit for the external terminals, a second interface control circuit for the flash memory chip, a third interface control circuit for the IC chip and an oscillator which generates, clocks to be output to the clock terminal of the IC chip.

14. The memory device according to claim 11, wherein the controller chip outputs, to the clock terminal of the IC chip, clocks independent of clocks inputted from the host apparatus via the external terminals.

15. The memory device according to claim 14, wherein:
   the controller chip includes an oscillator which generates clocks and a control circuit which controls the clocks generated by the oscillator independently of the clocks inputted from the host apparatus, and
   the controller chip outputs the clocks controlled by the control circuit to the clock terminal of the IC chip.

16. The memory device according to claim 11, wherein the controller chip is adapted to analyze a command inputted from the host apparatus via the external terminals, and adapted to determine whether to access the flash memory chip or the IC chip according to a type of the inputted command.

17. A memory device connectable with a host apparatus, comprising:
   external terminals for connecting with the host apparatus;
   a flash memory chip adapted to store data;
   an IC chip adapted to process data; and
   a controller chip connected with the external terminals, the flash memory chip and the IC chip, wherein:
      the external terminals include a command terminal, first and second ground terminals, a power terminal, a clock terminal and a data terminal,
      the flash memory chip includes a power terminal, a ground terminal, a data terminal, a ready/busy terminal, a chip enable terminal, an output enable terminal, a write enable terminal, a clock terminal and a reset terminal,
      the IC chip includes a power terminal, a reset terminal, a clock terminal, a ground terminal and a data terminal,
      the command terminal, the first and second ground terminals, the power terminal, the clock terminal and the data terminal of the external terminals are connected with the controller chip,
      the data terminal, the ready/busy terminal, the chip enable terminal, the output enable terminal, the write enable terminal, the clock terminal and the reset terminal of the flash memory chip are connected with the controller chip, and
      the reset terminal, the power terminal and the data terminal of the IC chip are connected with the controller chip.

18. The memory device according to claim 17, wherein:
   the power terminal of the flash memory chip is connected with the power terminal of the external terminals,
   the ground terminal of the flash memory chip is connected with the first and second ground terminals of the external terminals, and
   the ground terminal of the IC chip is connected with the first and second ground terminals of the external terminals.

19. The memory device according to claim 17, wherein:
   the IC chip includes a CPU, a ROM, a RAM and an EEPROM, and
   the controller chip includes a CPU, a first interface control circuit for the external terminals, a second interface control circuit for the flash memory chip, a third interface control circuit for the IC chip and a power generating circuit which generates power to be supplied to the power terminal, of the IC chip.

20. The memory device according to claim 17, wherein the controller chip is adapted to analyze a command inputted from the host apparatus via the external terminals, and adapted to determine whether to access the flash memory chip or the IC chip according to a type of the inputted command.

21. A memory device connectable with a host apparatus and which operates with power supplied from the host apparatus, comprising:
   external terminals for connecting with the host apparatus;
   a non-volatile memory chip which can store date;
   an IC chip which can process data; and a controller chip connected with the external terminals, the non-volatile memory chip and the IC chip, wherein:

the non-volatile memory chip, the IC chip and the controller chip are discrete chips, responsive to a command from the host apparatus, the controller chip writes data inputted from the host apparatus into the non-volatile memory chip via the external terminals, and responsive to a command from the host apparatus, the controller chip transfers data read from the non-volatile memory chip to the host apparatus via the external terminals, responsive to a command from the host apparatus, the controller chip transfers data inputted from the host apparatus to the IC chip via the external terminals, and responsive to a command from the host apparatus, the controller chip transfers data inputted from the IC chip to the host apparatus via the external terminals, and a power terminal and a data terminal of the external terminals are connected with the controller chip and a clock terminal of the IC chip is connected with the controller chip.

22. The memory device according to claim 21, wherein:

a power terminal and a data terminal of the IC chip are connected with the controller chip, and a ground terminal of the IC chip is connected with a ground terminal of the external terminals.

23. The memory device according to claim 21, wherein:

the IC chip includes a CPU, a ROM, a RAM and an EEPROM, and the controller chip includes a CPU, a first interface control circuit for the external terminals, a second interface control circuit for the non-volatile memory chip, a third interface control circuit for the IC chip and an oscillator which generates clocks to be output to the clock terminal of the IC chip.

24. A memory device connectable with a host apparatus and which operates with power supplied from the host apparatus, comprising:

external terminals for connecting with the host apparatus;

a non-volatile memory chip which can store date;

an IC chip which can process data; and a controller chip connected with the external terminals, the non-volatile memory chip and the IC chip, wherein:

the non-volatile memory chip, the IC chip and the controller chip are discrete chips, responsive to a command from the host apparatus, the controller chip writes data inputted from the host apparatus into the non-volatile memory chip via the external terminals, and responsive to a command from the host apparatus, the controller chip transfers data read from the non-volatile memory chip to the host apparatus via the external terminals, responsive to a command from the host apparatus, the controller chip transfers data inputted from the host apparatus to the IC chip via the external terminals, and responsive to a command from the host apparatus, the controller chip transfers data inputted from the IC chip to the host apparatus via the external terminals, a power terminal and a data terminal of the external terminals are connected with the controller chip, and a power terminal of the IC chip is connected with the controller chip.

25. The memory device according to claim 24, wherein:

a data terminal of the IC chip is connected with the controller chip, and a ground terminal of the IC chip is connected with a ground terminal of the external terminals.

26. The memory device according to claim 24, wherein:

the IC chip includes a CPU, a ROM, a RAM and an EEPROM, and the controller chip includes a CPU, a first interface control circuit for the external terminals, a second interface control circuit for the non-volatile memory chip, a third interface control circuit for the IC chip and a power generating circuit which supplies power to the power terminal of the IC chip.

27. A memory device connectable with a host apparatus, comprising:

external terminals for connecting with the host apparatus;

a non-volatile memory chip which can store date;

an IC chip which can process data; and a controller chip connected with the external terminals, the non-volatile memory chip and the IC chip, wherein:

the external terminals include a ground terminal, a power terminal and a data terminal, the non-volatile memory chip includes a power terminal, a ground terminal, a data terminal, a ready/busy terminal, a chip enable terminal, an output enable terminal, a write enable terminal, a clock terminal and a reset terminal, the IC chip includes a power terminal, a reset terminal, a clock terminal, a ground terminal and a data terminal, the ground terminal, the power terminal and the data terminal of the external terminals are connected with the controller chip, the data terminal, the ready/busy terminal, the chip enable terminal, the output enable terminal, the write enable terminal, the clock terminal and the reset terminal of the non-volatile memory chip are connected with the controller chip, and the reset terminal, the clock terminal and the data terminal of the IC chip are connected with the controller chip.

28. The memory device according to claim 27, wherein:

the power terminal of the non-volatile memory chip is connected with the power terminal of the external terminals, the ground terminal of the non-volatile memory chip is connected with the ground terminal of the external terminals, the power terminal of the IC chip is connected with the controller chip, and the ground terminal of the IC chip is connected with the ground terminal of the external terminals.

29. The memory device according to claim 27, wherein:

the IC chip includes a CPU, a ROM, a RAM and an EEPROM, and the controller chip includes a CPU, a first interface control circuit for the external terminals, a second interface control circuit for the non-volatile memory chip, a third interface control circuit for the IC chip and an oscillator which generates clocks to be output to the clock terminal of the IC chip.

30. A memory device connectable with a host apparatus, comprising:

external terminals for connecting with the host apparatus;

a non-volatile memory chip which can store data;

an IC chip which can process data; and a controller chip connected with the external terminals, the non-volatile memory chip and the IC chip, wherein the external terminals include a ground terminal, a power terminal and a data terminal, the non-volatile memory chip includes a power terminal, a ground terminal, a data terminal, a ready/busy terminal, a chip enable terminal, an output enable terminal, a write enable terminal, a clock terminal and a reset terminal, the IC chip includes a power terminal, a reset terminal, a clock terminal, a ground terminal and a data terminal, the ground terminal, the power terminal and the data terminal of the external terminals are connected with the controller chip, the data terminal, the ready/busy terminal, the chip enable terminal, the output enable terminal, the write enable terminal, the clock terminal and the reset terminal of the non-volatile memory chip are connected with the controller chip, and the reset terminal, the power terminal and the data terminal of the IC chip are connected with the controller chip.

31. The memory device according to claim 30, wherein:

the power terminal of the non-volatile memory chip is connected with the power terminal of the external terminals, the ground terminal of the non-volatile memory chip is connected with the ground terminal of the external terminals, and the ground terminal of the IC chip is connected with the ground terminal of the external terminals.

32. The memory device according to claim 30, wherein:

the IC chip includes a CPU, a ROM, a RAM and an EEPROM, and the controller chip includes a CPU, a first interface control circuit for the external terminals, a second interface control circuit for the non-volatile memory chip, a third interface control circuit for the IC chip and a power generating circuit which generates power to be supplied to the power terminal of the IC chip.

* * * * *

UNITED STATES PATENT AND TRADEMARK OFFICE
CERTIFICATE OF CORRECTION

PATENT NO. : 7,350,023 B2  Page 1 of 1
APPLICATION NO. : 11/636629
DATED : March 25, 2008
INVENTOR(S) : Nagamasa Mizushima et al.

It is certified that error appears in the above-identified patent and that said Letters Patent is hereby corrected as shown below:

On the Title Page
Insert the following:

-- (30)  Foreign Application Priority Data
      June 4, 2001 (Japan)     2001-167617 --

Signed and Sealed this

Seventh Day of April, 2009

JOHN DOLL
*Acting Director of the United States Patent and Trademark Office*